United States Patent
Opsenica

(10) Patent No.: US 11,748,137 B2
(45) Date of Patent: Sep. 5, 2023

(54) METHODS AND APPARATUS FOR MULTI-PROVIDER VIRTUAL NETWORK SERVICES

(71) Applicant: Telefonaktiebolaget LM Ericsson (publ), Stockholm (SE)

(72) Inventor: Miljenko Opsenica, Espoo (FI)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 285 days.

(21) Appl. No.: 16/969,931

(22) PCT Filed: Mar. 28, 2018

(86) PCT No.: PCT/EP2018/058007
§ 371 (c)(1),
(2) Date: Aug. 13, 2020

(87) PCT Pub. No.: WO2019/185144
PCT Pub. Date: Oct. 3, 2019

(65) Prior Publication Data
US 2021/0011753 A1    Jan. 14, 2021

(51) Int. Cl.
*G06F 9/455*    (2018.01)
*G06F 9/50*     (2006.01)
*H04L 67/51*    (2022.01)

(52) U.S. Cl.
CPC ........ *G06F 9/45558* (2013.01); *G06F 9/5077* (2013.01); *H04L 67/51* (2022.05); *G06F 2009/45595* (2013.01)

(58) Field of Classification Search
CPC ................................................ G06F 9/45558
(Continued)

(56) References Cited

U.S. PATENT DOCUMENTS 6,260,059 B1 * 7/2001 Ueno ..................... G06N 5/043
709/201
10,965,737 B1 * 3/2021 Parulkar ............. H04L 63/0272
(Continued)

OTHER PUBLICATIONS

International Search Report and Written Opinion of the International Searching Authority for PCT International Application No. PCT/EP2018/058007 dated Aug. 30, 2018.
(Continued)

*Primary Examiner* — Mehran Kamran
(74) *Attorney, Agent, or Firm* — SAGE PATENT GROUP

(57) ABSTRACT

Embodiments herein provide methods and apparatus for providing multi-provider virtual network service. A first lifecycle management, LCM, component is provided controlled by a first service provider in a virtual network, wherein the virtual network comprises a trusted LCM component controlled by a trusted provider configured to provide a decentralised trust system between a plurality of LCM components controlled by different service providers in the virtual network. The first LCM component may perform a method comprising receiving a service request to provide a first service; responsive to a determination that the first service cannot be fully provided by the first service provider, generating a first tag representing a portion of the first service that the first service provider cannot provide; transmitting a discovery request to the trusted LCM component, wherein the discovery request comprises the first tag; receiving, from the trusted LCM component based on the first tag, a list of LCM components comprising a second LCM component controlled by a second service provider, wherein the second service provider is capable of providing a part of the portion of the first service; and transmitting a provision request to the second LCM component to provide the part of the portion of the first service.

24 Claims, 17 Drawing Sheets

(58) Field of Classification Search
USPC .......................................................... 718/1
See application file for complete search history.

(56) References Cited

U.S. PATENT DOCUMENTS

| | | | | |
|---|---|---|---|---|
| 11,063,745 | B1* | 7/2021 | Du | H04L 9/0825 |
| 11,397,919 | B1* | 7/2022 | Thiagrajan | G06F 21/645 |
| 2003/0005078 | A1* | 1/2003 | Turicchi, Jr. | H04L 69/40 |
| | | | | 709/239 |
| 2005/0027871 | A1* | 2/2005 | Bradley | G06Q 20/1235 |
| | | | | 709/227 |
| 2005/0125508 | A1* | 6/2005 | Smith | H04L 67/1008 |
| | | | | 709/220 |
| 2012/0117241 | A1* | 5/2012 | Witt | H04L 67/00 |
| | | | | 709/226 |
| 2012/0137075 | A1* | 5/2012 | Vorbach | G06F 9/526 |
| | | | | 711/E12.024 |
| 2017/0269955 | A1* | 9/2017 | Hardy | G06F 9/45558 |
| 2017/0353495 | A1* | 12/2017 | Raghavan | H04L 63/20 |
| 2017/0359424 | A1* | 12/2017 | Holdsworth | H04L 67/10 |
| 2018/0069899 | A1* | 3/2018 | Lang | G06F 8/38 |
| 2018/0077020 | A1* | 3/2018 | Li | H04L 41/5054 |
| 2018/0131557 | A1* | 5/2018 | Chou | H04L 41/044 |
| 2018/0285794 | A1* | 10/2018 | Gray-Donald | G06F 9/5005 |
| 2019/0073269 | A1* | 3/2019 | Chou | H04L 43/08 |
| 2019/0102777 | A1* | 4/2019 | Konik | H04L 9/3236 |
| 2019/0130261 | A1* | 5/2019 | Rallapalli | G06N 3/10 |
| 2019/0258971 | A1* | 8/2019 | Winarski | G06Q 10/063114 |
| 2019/0279106 | A1* | 9/2019 | Yadav | G06N 5/04 |
| 2020/0044919 | A1* | 2/2020 | Yao | H04L 41/0806 |
| 2021/0406071 | A1* | 12/2021 | Groenewald | G06F 8/31 |

OTHER PUBLICATIONS

"IEEE P1903(TM)/D1 Draft Architecture Document for Next Generation Service Overlay Network," IEEE Draft; Mar. 2010, pp. 1-90.
Aniruddha Sinha et al., "Adjunct Proceedings," EUROITV 2012, 10th European Interactive TV Conference, Berlin Jul. 4-6, 2012, pp. 203-208, 306-3010, and 315-318.
Hyperledger Fabric, https://hyperledger-fabric.readthedocs.io/en/latest/, retrieved on Mar. 2, 2018, 11 pages.
International Search Report and Written Opinion of the International Searching Authority for PCT International Application No. PCT/EP2018/058008 dated Aug. 6, 2018.
Deloitte, "Blockchain© Telco—How blockchain can impact the telecommunications industry and its relevance to the C-Suite," Nov. 28, 2016.

* cited by examiner

Fig. 1 – Prior Art

METHODS AND APPARATUS FOR MULTI-PROVIDER VIRTUAL NETWORK SERVICES

CROSS REFERENCE TO RELATED APPLICATION

This application is a 35 U.S.C. § 371 national stage application of PCT International Application No. PCT/EP2018/058007, filed on Mar. 28, 2018, the disclosure and content of which is incorporated herein by reference in its entirety.

TECHNICAL FIELD

Embodiments disclosed herein relate to the provision of services by multiple providers in a virtual network. In particular methods and embodiments described herein allow for the collaboration between a plurality of service providers to provide multi-provider services.

BACKGROUND

While virtualization and digitalization has moved in industry beyond the initial hype phase, the transformation into the telecommunications industry is still full of challenges. Orchestration and automation tool-chains, as a major enablers of such transformation, are often defined, deployed and specialized for a specific technology and/or service.

With a growing number of virtualized functions there is also growing number of function/service providers. The increasing number of service providers and individual services increases complexity of the industry and the heterogeneity required for different services and offered functionalities.

Benefits of such development comprise easy sharing of interoperable functions as well as having multiple choices to fulfil targeted services. In this respect, the industry is moving towards common eco-systems where a service provider can offer service in its own expertise zone filling the gaps with external eco-system functions. There are related expanding business models also called X as a service (XaaS) where X can stand for one to many functions fulfilling service in one or more segments in a cloud stack.

To enable this multi-provider playground and boost automation benefits, service providers may be able to handle not only the responsibility of their own domain of resources but at a same time may be able to share some dependent resources to fulfill end-2-end service requirements.

There are multiple standardization bodies (ETSI, ONAP, NGMN, MEF, IETF, etc.) working on common architecture and concepts (NFV, SDN, 5G) to support such new business models and related growing services.

In order to allow such multi-provider services, automated orchestration between the service providers which can cope with such a large matrix of heterogeneity may be required. The main target here is to define more generic orchestration mechanisms with a focus on agility and flexibility.

Although some service providers do try to follow the recommendations of standardization bodies, they may still have different implementations of orchestration mechanisms which may be optimized for the proprietary functionality of that service provider. In particular, some service providers prefer to manage life-cycles with a local lifecycle management component, which may be optimized for dedicated functions.

New business models have also been introduced where, for instance, a single virtual network function (VNF) can also be offered as a service (VNFaaS). Such a trend further increases granularity and heterogeneity of multi-provider domains.

For multi-provider services therefore, traditionally agreements between the different service providers have been handled on the higher BSS/OSS levels. With a new multi-provider playground complexity such channels become orchestration bottlenecks where loops crossing multiple vertical management layers slow down the orchestration routines.

Current service models therefore do not provide any direct interaction between lifecycle subdomains if they are controlled by different service providers. The only available way is to port functions from one domain into the other domain and provide the orchestration using a single Lifecycle Management (LCM) component controlled by a single service provider. Unfortunately, this can be too slow, too expensive and an inflexible solution. Current industry trends requires more agile and flexible solutions where integration and allocation of resources happens in a few seconds rather than in months.

SUMMARY

According to the some embodiments there is provided a method, in a first lifecycle management, LCM, component controlled by a first service provider in a virtual network, wherein the virtual network comprises a trusted LCM component controlled by a trusted provider configured to provide a decentralised trust system between a plurality of LCM components controlled by different service providers in the virtual network. The method comprises receiving a service request to provide a first service; and responsive to a determination that the first service cannot be fully provided by the first service provider, generating a first tag representing a portion of the first service that the first service provider cannot provide. The method further comprises transmitting a discovery request to the trusted LCM component, wherein the discovery request comprises the first tag; receiving, from the trusted LCM component based on the first tag, a list of LCM components comprising a second LCM component controlled by a second service provider, wherein the second service provider is capable of providing a part of the portion of the first service; and transmitting a provision request to the second LCM component to provide the part of the portion of the first service.

According to some embodiments there is provided a method, in a trusted Lifecycle Management, LCM, component controlled by a trusted service provider in a virtual network, wherein the trusted LCM component is configured to provide a decentralised trust system between a plurality of lifecycle management, LCM, components controlled by different service providers in the virtual network. The method comprises receiving a discovery request from a first LCM component controlled by a first service provider, wherein the discovery request comprises a first tag associated with a portion of a first service that the first service provider cannot provide; and obtaining, based on the first tag and a membership record comprising entries for each of the plurality of LCM components enrolled on the decentralised trust system, a list of LCM components comprising a second LCM component controlled by a second service provider, wherein the second service provider is capable of providing a part of the portion of the first service. The method further comprises transmitting the list to the first LCM component.

According to some embodiments there is provided a method, in a second Lifecycle Management, LCM, component controlled by a second service provider in a virtual network wherein the virtual network comprises a trusted LCM component, controlled by a trusted service provider, configured to provide a decentralised trust system between a plurality of LCM components controlled by different service providers in the virtual network. The method comprises establishing a transaction protocol between the second LCM component and a first LCM component, wherein the first LCM component is enrolled with the decentralised trust system; and receiving a provision request from the first LCM component to provide a part of a portion of a first service. The method further comprises providing the part of the portion of the first service.

According to some embodiments there is provided a first Life Cycle Management, LCM, component controlled by a first service provider in a virtual network, wherein the virtual network comprises a trusted LCM component controlled by a trusted provider configured to provide a decentralised trust system between a plurality of LCM components controlled by different service providers in the virtual network. The first LCM component comprises processing circuitry configured to receive a service request to provide a first service; responsive to a determination that the first service cannot be fully provided by the first service provider, generate a first tag representing a portion of the first service that the first service provider cannot provide; and transmit a discovery request to the trusted LCM component, wherein the discovery request comprises the first tag. The processing circuitry is further configured to receive, from the trusted LCM component based on the first tag, a list of LCM components comprising a second LCM component controlled by a second service provider, wherein the second service provider is capable of providing a part of the portion of the first service; and transmit a provision request to the second LCM component to provide the part of the portion of the first service.

According to some embodiments there is provided a trusted Lifecycle Management, LCM, component controlled by a trusted service provider in a virtual network, wherein the trusted LCM component is configured to provide a decentralised trust system between a plurality of lifecycle management, LCM, components controlled by different service providers in the virtual network. The trusted LCM component comprises processing circuitry configured to receive a discovery request from a first LCM component controlled by a first service provider, wherein the discovery request comprises a first tag associated with a portion of a first service that the first service provider cannot provide; and obtain, based on the first tag and a membership record comprising entries for each of the plurality of LCM components enrolled on the decentralised trust system, a list of LCM components comprising a second LCM component controlled by a second service provider, wherein the second service provider is capable of providing a part of the portion of the first service. The processing circuitry is further configured to transmit the list to the first LCM component.

According to some embodiments there is provided a second Lifecycle Management, LCM, component controlled by a second service provider in a virtual network wherein the virtual network comprises a trusted LCM component, controlled by a trusted service provider, configured to provide a decentralised trust system between a plurality of LCM components controlled by different service providers in the virtual network. The second LCM component comprising processing circuitry configured to establish a transaction protocol between the second LCM component and a first LCM component, wherein the first LCM component is enrolled with the decentralised trust system; receive a provision request from the first LCM component to provide a part of a portion of a first service; and provide the part of the portion of the first service.

According to some embodiments there is provided a computer program comprising instructions which, when executed on at least one processor, cause the at least one processor to carry out the method as described above.

According to some embodiments there is provided a computer program product comprising a computer-readable medium with the computer program as described above.

BRIEF DESCRIPTION OF THE DRAWINGS

For a better understanding of the present invention, and to show how it may be put into effect, reference will now be made, by way of example only, to the accompanying drawings, in which.

DESCRIPTION

Some of the embodiments contemplated herein will now be described more fully with reference to the accompanying drawings. Other embodiments, however, are contained within the scope of the subject matter disclosed herein, the disclosed subject matter should not be construed as limited to only the embodiments set forth herein; rather, these embodiments are provided by way of example to convey the scope of the subject matter to those skilled in the art.

Direct interaction between life-cycle domains may be an important enabler of a multi-provider eco-system. To make such interaction possible, there are many aspects that have to be standardized and unified. One of the major open concerns is still security and lack of trustiness between the service providers on the orchestration levels below BSS/OSS levels. Thus, in current solutions, complex multilayered orchestration interactions may be required even for simple services. There is, as of yet, no existing industry solution for how to directly communicate between life-cycle management domains using agile, simple and flexible orchestration mechanisms.

Figure 1:
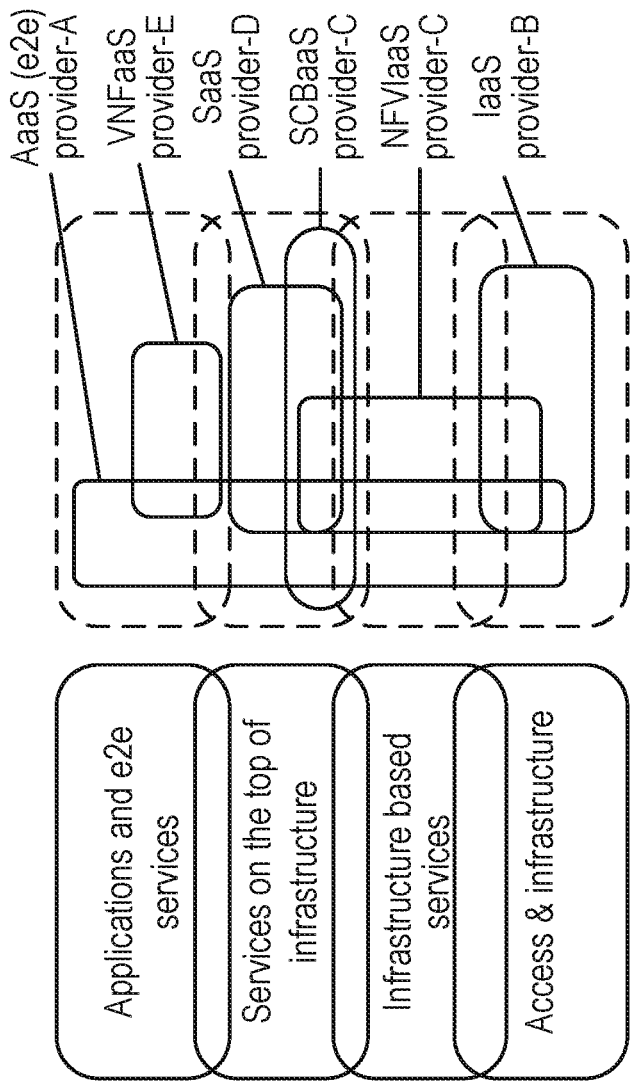
FIG. 1 illustrates a multi-provider ecosystem.

FIG. 1 illustrates a multi-provider ecosystem. In such an ecosystem a single service provider may offer a service which spans different levels of the architecture stack consuming different types of resources. Those resources are Lifecycle Management (LCM) assets which may be used for targeted service fulfilment. Resources can be owned by the different service providers. Infrastructure can also be mashed up and provided by the multiple service providers. Different services and functions can be offered on the top of the infrastructure, and applications built on the top can utilize different services and functions to fulfill required services.

In such a multi-provider ecosystem, each service provider can offer any service, X as a service (XaaS). The service X may then be provided fully by the particular service provider or mashed up with the other service provider(s). For instance service provider A may offer mashup application (AaaS$^A$) that uses infrastructure resources provided by service provider B (IaaS$^B$) and network function virtualisation (NFV) eco-system on the top provided by service provider C (NFVIaaS$^C$). It can also use additional services on the top of the infrastructure provided by service provider D (SaaS$^D$), and additional virtual network functions (VNFs) provided by service provider E as "VNF as a service" (VNFaaS$^E$).

In some embodiments disclosed herein a service provider, in this example service provider C, can be added and deployed on the top of multi-provider NFV eco-system (NFVI) to enable a decentralized trust system between the different service providers, for example a Blockchain system. Every service provider may then directly negotiate shared and dependent resources with other LCM components using smart business contracts. In some embodiments therefore, each Blockchain peer here comprises an LCM component, where each LCM component may be controlled by a different service provider.

Blockchain mechanisms may be supported by each LCM node through Blockchain adapter layer components containing toolsets and Blockchain enablers. The Blockchain adapter layer may also interconnect with each LCM component and LCM specific Blockchain interaction functionality. The skilled person will appreciate how such a Blockchain, or other decentralized trust system may be established.

In the example of FIG. 1, the Blockchain network is established by the NFV eco-system provider C (NFVIaaS$^C$) as an additional service, Smart Contract Blockchain as a Service (SCBaaS$^C$). Part of this service may be related toolsets including a software development kit and access applications for a Blockchain network that can be part of each LCM node. LCM Blockchain peers may have committers or/and endorsing capabilities.

Figure 2:
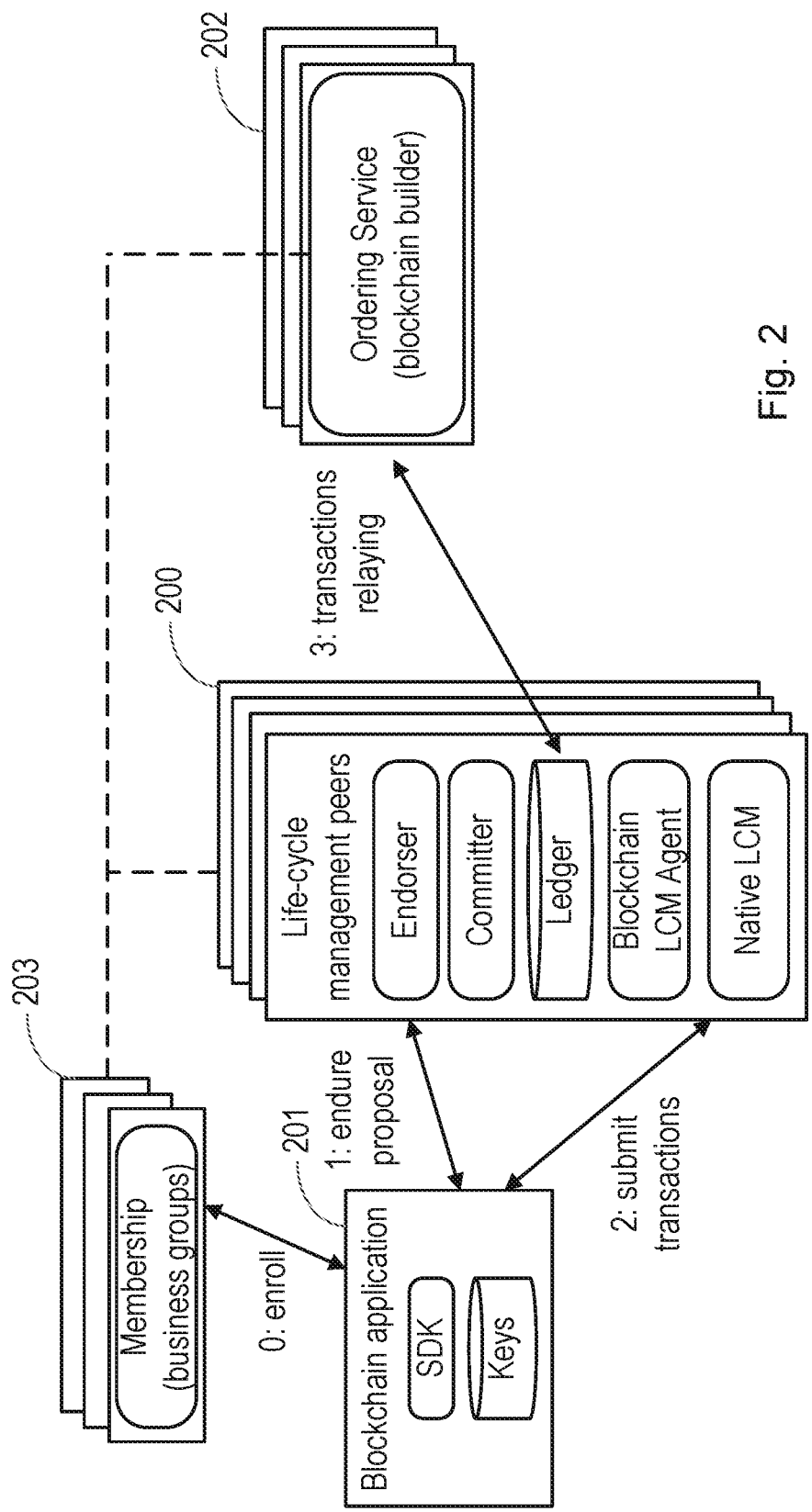
FIG. 2 illustrates an example of LCM components as Blockchain peers.

FIG. 2 illustrates the LCM Blockchain peers 200. A committer peer may commit transactions and maintain the ledger and state. An endorsing peer may receive transaction proposals for endorsement, and may respond either granting or denying endorsement. Each LCM component peer may act as either an endorser or committer. The decentralized trust system may comprise ordering service nodes 202 and membership peers nodes 203 which may be provided by the decentralized trust system provider, i.e. service provider C in the example of FIG. 1. The decentralized trust system may also comprise a trusted LCM component 201. Ordering nodes 202 may approve channel establishment, include transaction blocks into the ledger and communicate status of the transaction blocks with committer and endorsing peer nodes. Membership nodes 203 may handle memberships of the decentralized trust network, in other words control which LCM components are peers of the decentralized network.

Embodiments described herein may therefore use a consensus based negotiation and a decentralized trust system, for example, Blockchain technology. For example, a smart contract based peer to peer network and LCM consensus based components may be used to enable direct interactions between LCM component peers and to bridge trustless domains. LCM components may use decentralized trust system technologies to empower native LCM routines. Embodiments disclosed herein therefore enable simple, agile and open life-cycle management routines. Embodiments described herein therefore allow for use of the shortest path directly between life-cycle managers belonging to a different function/service providers which avoids slow and complex orchestration negotiations cross the multiple orchestration levels.

Embodiments described herein provide elastic and open solutions for the direct life-cycle management between one or more LCM components. Embodiments described herein make use of a decentralized trust system, for example, of a Blockchain distributed peer to peer network to solve trustless gaps between different service providers. The LCM components for peers with the Blockchain system and they therefore contain data about transactions that have happened on the chain of their interest. Transactions are mutually agreed on a given orchestration assets and signed using public key encryption. Some of these nodes may be unreliable, and therefore the consensus process may need to be reliant.

Some Blockchain systems use smart contract consensus algorithms enabling decentralized life-cycle management. LCM smart contracts contain programs that can store data, make decisions, and indirectly communicate with other contractors via messages. These contracts are established in the Blockchain network by their owners, but their execution is taken care of by the Blockchain network. Hyperleger Fabric™, hosted by The Linux Foundation® is an example of such Blockchain system which intends to be a service that manages different assets, agreements and transactions between various organizations, i.e., forms a Blockchain business network. As will be appreciated by the person skilled in the art, such a system may be established by arbitrary service provider for instance by trusted infrastructure provider.

Figure 3:
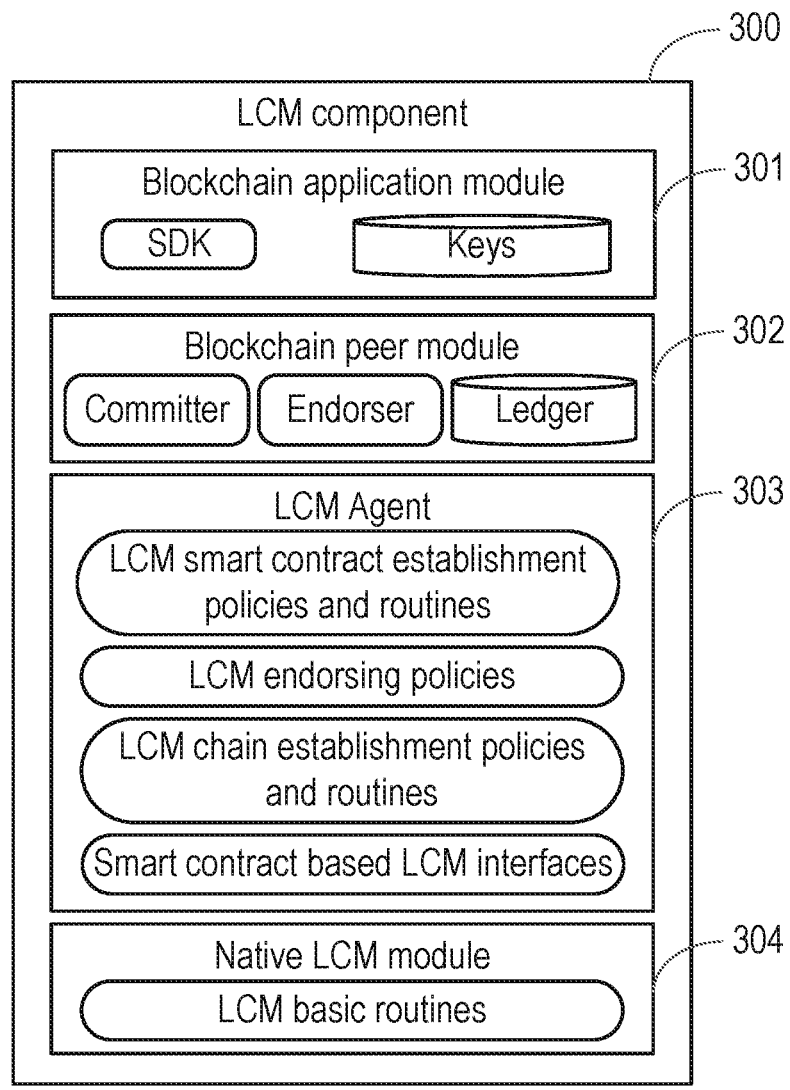
FIG. 3 illustrates an example of an LCM component according to some embodiments.

FIG. 3 illustrates an example of an LCM component 300 according to some embodiments.

The LCM component may, as described previously, comprise a Blockchain application module 301 comprising an appropriate software development kits (SDK) and keys. The LCM component 300 may also comprise Blockchain peer module 302 configured to act as a committer or endorser peer as appropriate.

The LCM component 300 may also comprise an LCM agent 303 configured to establish smart contracts as will be described in more detail later. The LCM component 300 may also comprise a native LCM module 304 configured to provide any local services which the first service provider is capable of providing.

Figure 4:
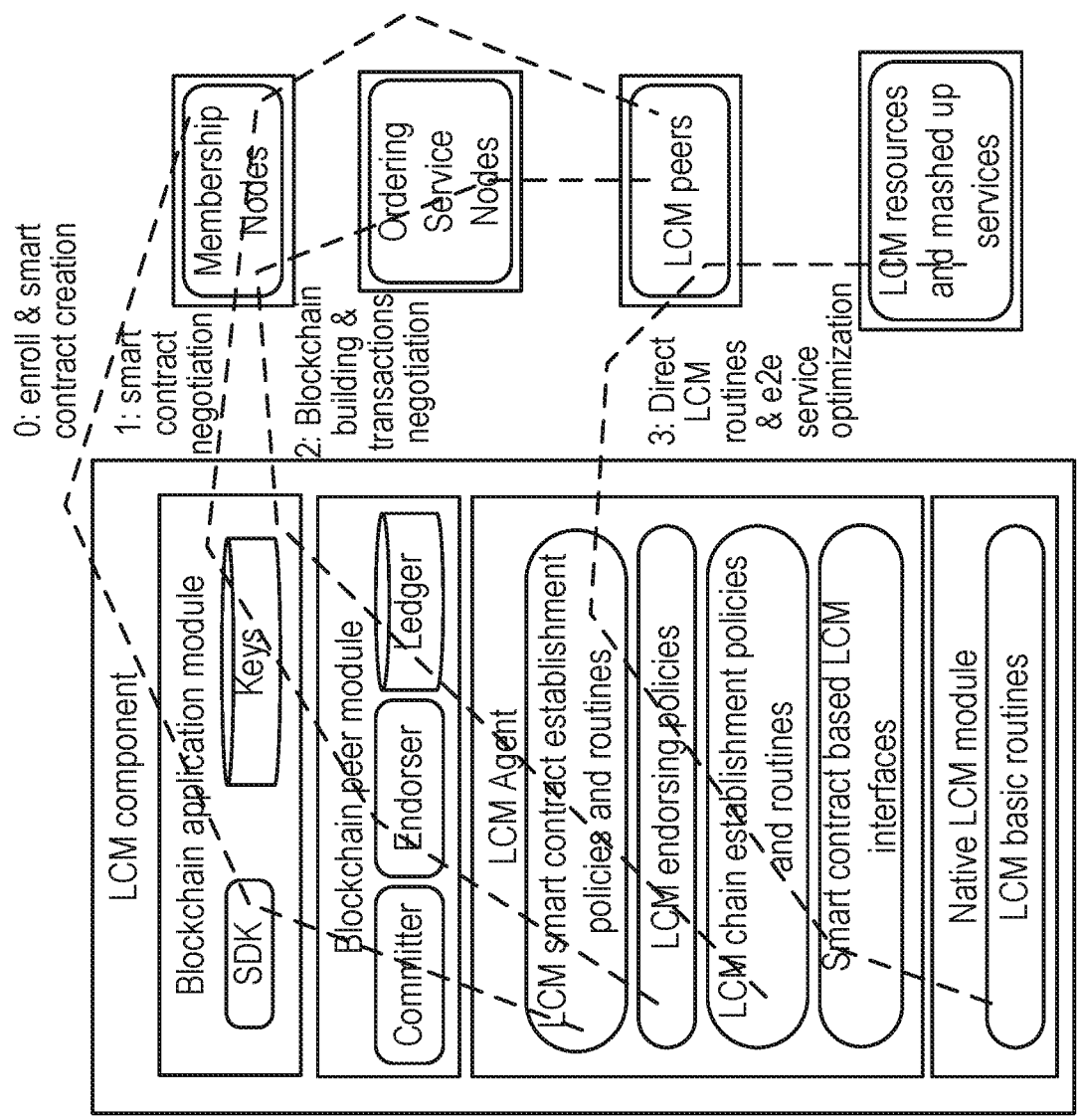
FIG. 4 illustrates the four main steps of a procedure to establish direct LCM component interactions according to some embodiments.

FIG. 4 illustrates the four main steps of the procedure to establish direct LCM component interactions between domains controlled by different service providers and responsible lifecycle managers. Step 0 comprises smart contract offerings and Blockchain network enrolment. Step 1 comprises LCM smart contract establishment based on consensus based authorization and LCM provider discovery. Step 2 comprises providing detailed LCM transactions and business contract fulfilment. Step 3 comprises direct LCM orchestration and mashup service fulfilment.

For ease of reference we will separate these steps into sections.

Enrollment with the Decentralized Trust System

Figure 5:
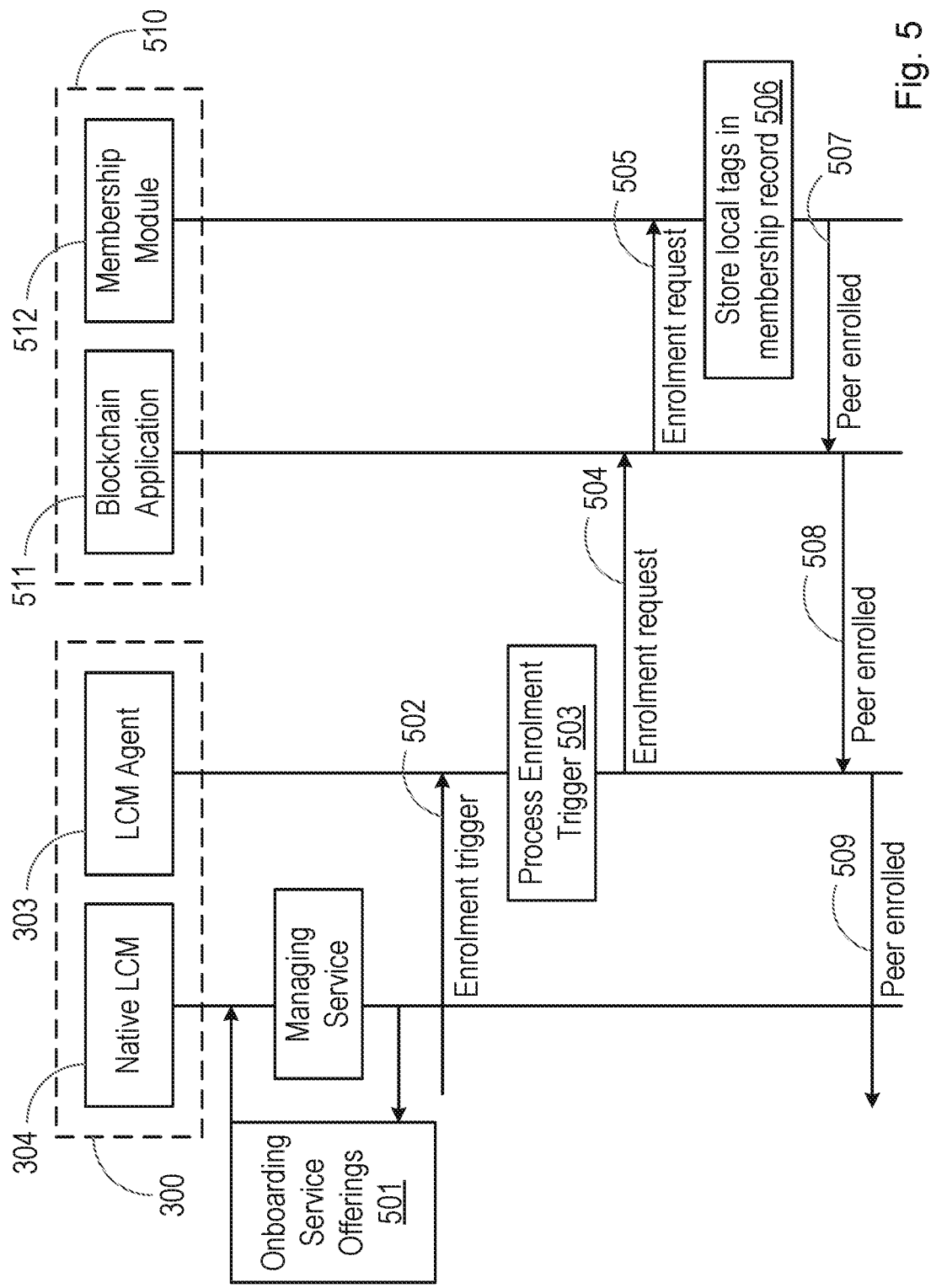
FIG. 5 illustrates an enrolment process according to some embodiments.
Figure 6:
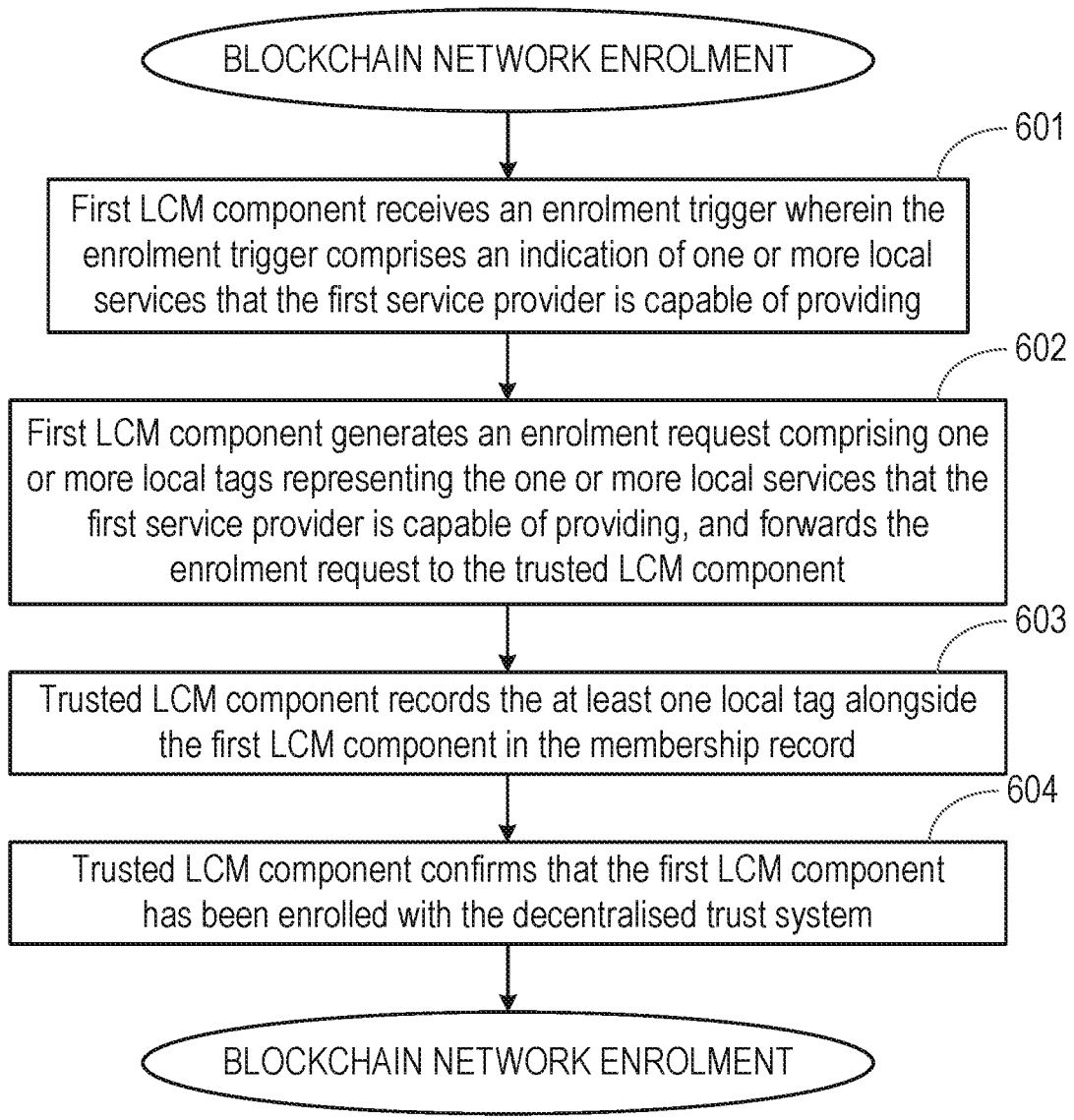
FIG. 6 illustrates an enrolment process according to some embodiments.

FIGS. 5 and 6 illustrate an example of an enrolment process.

FIG. 5 illustrates an enrolment process. The enrolment process is to enroll a first LCM component in a virtualised network such as the network illustrated in FIG. 2. As described previously the virtual network comprises a trusted provider configured to provide a decentralised trust system between a plurality of LCM components 200 controlled by different service providers in the virtual network. The decentralised trust system may comprise a Blockchain trust system implemented by the trusted service provider.

As described previously, the LCM component 300 may comprise a first native LCM module 304 and a first LCM agent 303. In the following example some steps are performed by the first LCM agent, and others by the first native LCM module. It will however be appreciated that in some examples, the functionality of these two modules is not physically separated, and all steps may be implemented by the first LCM component in general.

The first LCM component may be controlled by a first service provider and may be capable of providing local services to requesting customers. For example, the first LCM component may be able to route communications between three customer end points, for example points A, B and C in a virtual network.

The trusted provider may comprise a trusted LCM component 510. The trusted LCM component may be controlled by the trusted provider and may be configured to provide the decentralized trust system as a service. The trusted LCM component may comprise a Blockchain application module 511 and a membership peer module 510.

In step 501 the first native LCM module 304 may on-board its own service offerings. This will be described in more detail in FIG. 7. In some examples, as illustrated in FIG. 5, onboarding of the service offerings may be performed prior to first service provider enrolment, but it may also be performed in the later stages of the process as per LCM demand. Reservation of the resources for the initial service offerings onboarding can also be part of the separate smart contract in the relationship with the infrastructure provider.

In step 502 the first LCM agent 303 receives an enrolment trigger from the first service provider. The trigger may be a business related intention for fulfilling a targeted application and/or for providing selected service that can be used for any related application. The LCM agent 303 may then process, in step 503, the enrolment trigger against any local LCM enrolment policies and may generate at least one local tag representing at least one local service that the first service provider is capable of providing. For example, as the first service provider is capable of routing traffic between the end points A, B and C, an example of a local tag may be dR: A, B, C, which illustrates that the first service provider is capable of providing a distributed router (dR) between the end points A, B and C. This distributed router example will be used throughout the application. It will however be appreciated that the principles described herein may be applied to any type of service, and that routing of traffic is used as an illustrative example. For example, the first service may be of a completely different type and different level in the cloud stack.

The at least one local tag may also contain further information regarding the local services. For example the at least one local tag may indicate the first service provider's reputation, service price, modelling and/or relationships with other LCM components.

The first LCM agent 303 may then transmit, in step 504, an enrolment request to the Blockchain application 511. The enrolment request may comprise the at least one local tag representing at least one local service that the first service provider is capable of providing.

In step 505 the Blockchain application 511 receives the enrolment request and forwards it to the membership peer module 512. The membership peer module 512 may then record, in step 506, the at least one local tag in the enrolment request alongside the first LCM component in a membership record. The membership peer module 512 may perform this for any enrolment request it receives and the membership record may therefore comprise a record of which LCM components are enrolled with the decentralised trust system, and a record of what local services that each of those enrolled LCM components are able to provide.

For example, the membership record may comprise a list of LCM components and their associated tags. An example of this is illustrated in table 1.

TABLE 1

An example of a membership record where R: indicates a routing service between the following end points, and dR: indicates a distributed routing service between the following end points.

| LCM component | Tags |
| --- | --- |
| $2^{nd}$ LCM component | R: D and E |
| $3^{rd}$ LCM component | R: D and E |
| $4^{th}$ LCM component | dR: C, D and E |
| $5^{th}$ LCM component | R: G, H |
| $6^{th}$ LCM component | dR: F, G, H |
| $7^{th}$ LCM component | R: G, H |
| $8^{th}$ LCM component | R: C, D |

In step 507 the membership peer module 512 confirms to the Blockchain application 511 that the first LCM component has been enrolled with the decentralised trust system. This confirmation is then passed on to the first LCM agent by the Blockchain application in step 508. The first LCM agent 303 may then confirm its enrolment with the decentralised trust system to the first service provider in step 509.

The enrolment process may therefore be summarized as illustrated in FIG. 6. In step 601 the first LCM component receives an enrolment trigger, wherein the enrolment trigger comprises an indication of one or more local services that the first service provider is capable of providing. In step 602, the first LCM component generates an enrolment request comprising one or more local tags representing the one or more local services that the first service provider is capable of providing, and forwards the enrolment request to the trusted LCM component In step 603, the trusted LCM component records the at least one local tag alongside the first LCM component in the membership record.

In step 604, the trusted LCM component confirms that the first LCM component has been enrolled with the decentralised trust system.

In some examples, the enrolment of the first service provider enrolment may be part of a regular NFVI enrolment as an additional service option depending on the chosen ecosystem establishment solution.

Figure 7:
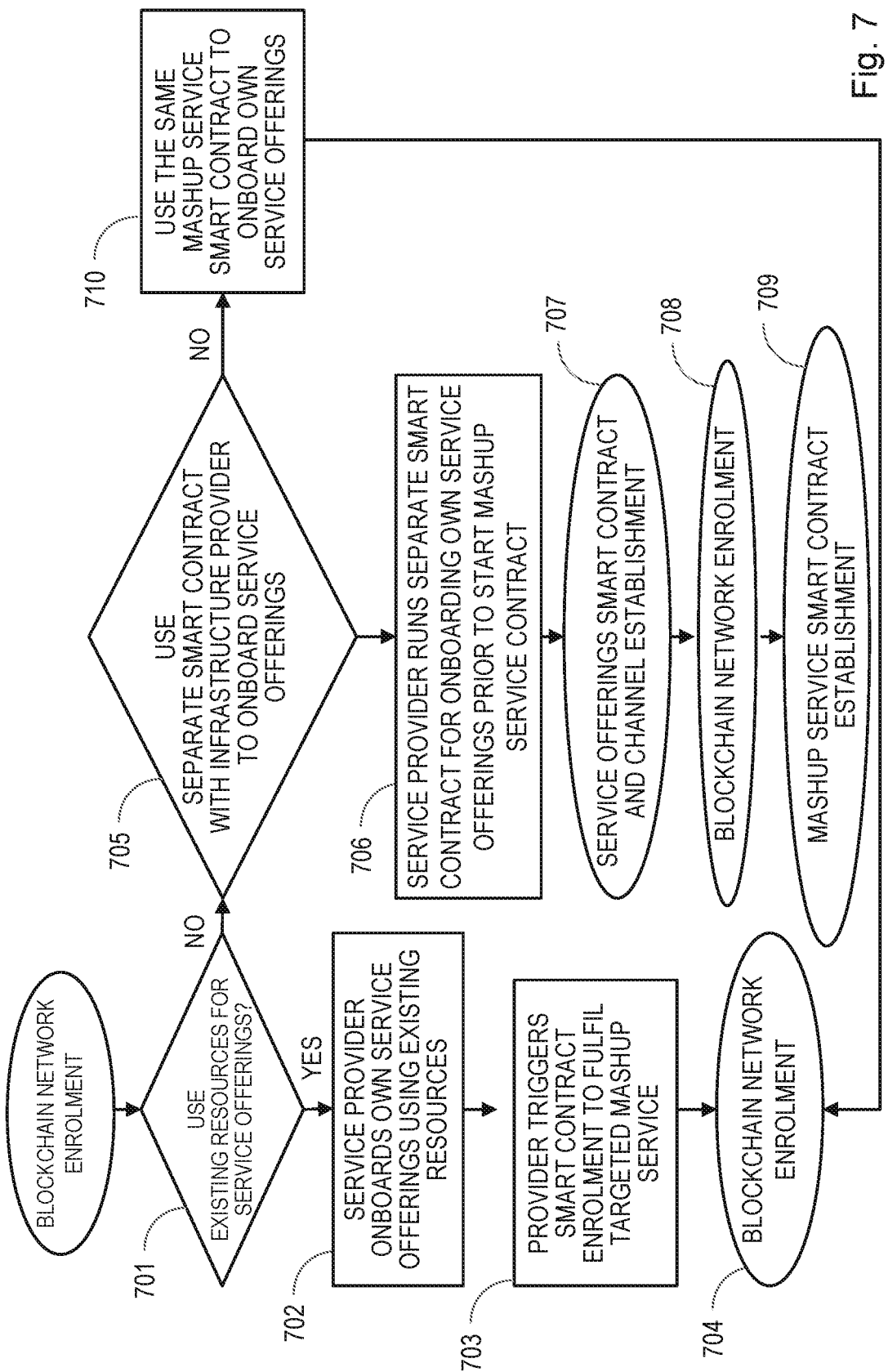
FIG. 7 illustrates onboarding of service offerings according to some embodiments.

FIG. 7 illustrates onboarding of the service and related resource management.

In step 701 the service provider determines whether allocated resources are already available for the onboarding of a new service. If the services are available the method assess to step 702 in which the new service is onboarded using the existing resources.

In step 703 the service provider may then trigger a smart contract enrolment for the fulfilment of a targeted mashup service. The Blockchain network enrolment may then occur in step 704.

If in step 701 the service provider determines that there are not allocated resources already available for the onboarding of the new service, the method passes to step 705 in which the service provider determines whether to use a separate smart contact with other provider to allocate the required resources for the new service. If the service provider decides to use a separate contract in step 705, the service provide may create the separate contract in step 706 with the required infrastructure resource service provider(s). This contract may be established and enrolled in steps 707 and 708. The service provider may then allocate needed resources through that contract and proceed with onboarding of a service and creation of the new contract in step 709 to fulfil a targeted mashup service.

If in step 705 the service provider determines not to use a separate smart contract, the service provider may use the same contract for allocation of the resources to perform other engagements with the eco-system and fulfill targeted application fulfilment in step 710.

Smart Contract Establishment

Figure 8:
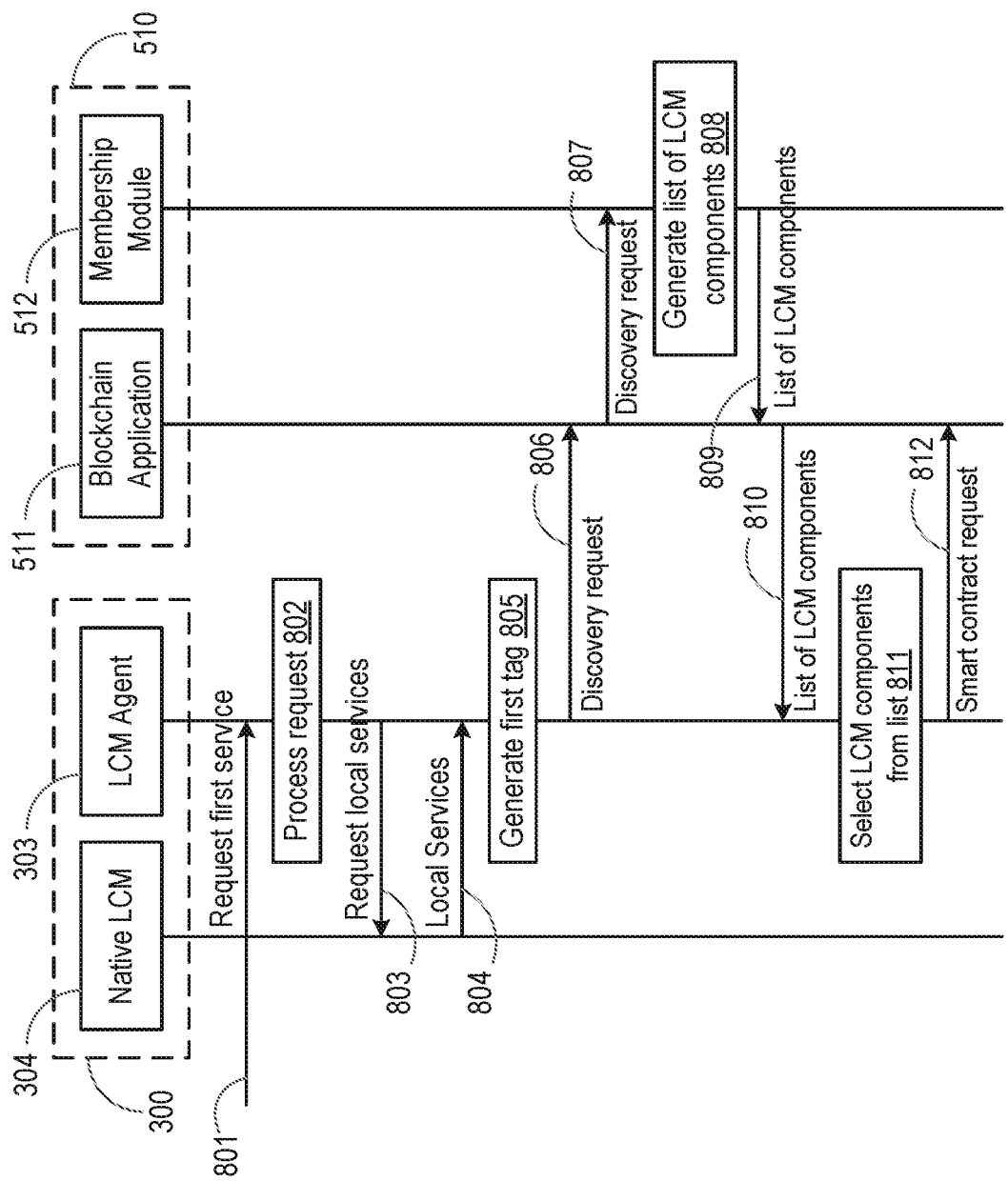
FIG. 8 illustrates smart contract establishment according to some embodiments.
Figure 9:
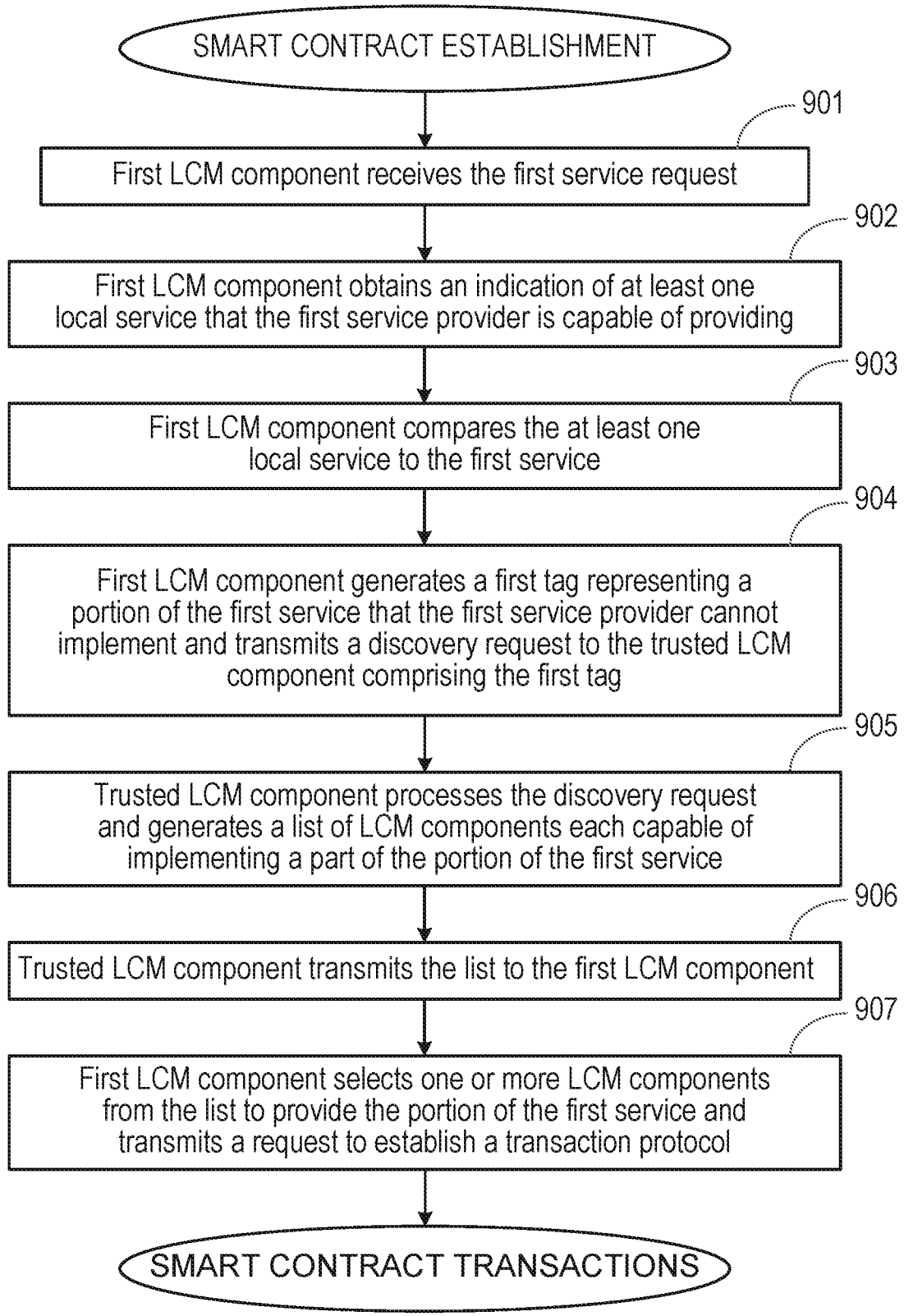
FIG. 9 illustrates smart contract establishment according to some embodiments.

FIGS. 8 and 9 illustrate smart contract establishment according to some embodiments.

FIG. 8 illustrates an example of the signalling required for smart contract establishment according to some embodiments. In step 801 the first LCM agent 303 receives a service request to provide a first service. The first service request may comprise information describing the service required. The first service request may also comprise information relating to contract configuration and policies, constraints and Key Performance Indicators (KPIs) to be fulfilled in providing the first service.

The first LCM agent may then compare the service request to LCM policies in step 802. For example, the LCM policies may restrict the types of service requests that the first LCM component is allowed to use multi-provider services to provide. In these examples, the LCM component 300 may only attempt to provide a multi-provider service if the service request is of a type for which this is deemed allowable by the LCM policies.

LCM policies may also comprise pricing policies, location based policies, and/or any performance related policies. LCM policies may also comprise policies related to external service provider(s) such as contract restrictions, reputation requirements, requested level of shared LCM routines and any other suitable policies.

In step 803 the first LCM agent 303 may then request an indication of the local services available from the native LCM module 304. In step 804 the first LCM agent 303 may receive an indication of the local services from the native LCM module 304.

The first LCM agent 303 then determines, in step 805, whether or not the first service can be fully provided by the first service provider. In some embodiments, the first LCM agent may compare the first service to the one or more local services that the first service provider is capable of providing. In some examples, the first service provider is capable of fully providing the first service, and in these examples, may simply provide the first service as requested. For example if the first service is routing service between end points A and B the first service provider is capable of fully providing the first service. In this example, the first service provider may provide the first service as requested.

In some embodiments, however, in step 805 the first LCM agent 303 may determine that a portion of the first service cannot be provided by the first service provider. For example, the first service may be a distributed router between five end points, for example points A, B, C, D and E in the virtual network. In this example, as the first service provider is only capable of routing traffic between end points A, B and C, the first service provider is not capable of providing the full first service.

Responsive to this determination, the first LCM agent 303 may generate a first tag representative of the portion of the first service that the first service provider cannot provide. Therefore, if the first service comprises a distributed router between the end points A, B, C, D and E, the first LCM component may generate a first tag representing routing traffic between the points D, E and at least one of the points A, B and C. In other words, the first LCM component may generate a first tag representing the gaps in the first service which cannot be provided by the first LCM component. The first tag may therefore be expressed as dR: D, E, A/B/C. This tag indicates the portion of the first service that the first service provider cannot provide.

Similarly to the local tag, the first tag may also comprise information related to the provider reputation, service price and any other information relating to the portion first service that the candidate LCM components to fulfill the portion of the first service may adhere. In some embodiments, the first LCM agent may generate a plurality of first tags representative of the portion of the first service.

The first LCM agent may then transmit a discovery request to the trusted provider comprising the first tag. The trusted provider may then obtain, based on the first tag and the membership record, a list of LCM components comprising a second LCM component controlled by a second service provider, wherein the second service provider is capable of implementing a part of the portion of the first service.

For example, the Blockchain application module 511, may receive the discovery request in step 806. The Blockchain application module 511 may then transmit a peer query to the membership peer module 512 in step 807. The membership peer module 512 may then cross check the first tag with the entries in the membership record and may compile a list of LCM components in step 808. In other words, the membership peer node may locate at least one entry in the membership record comprising at least one tag which indicates that the associated LCM component is capable of implementing at least a part of the service represented by the first tag In some examples, the membership peer module may locate a plurality of LCM components, each capable of providing at least a part of the service represented by the first tag. The list of LCM components therefore comprise candidate LCM components each capable of providing at least a part of the portion of the first service. For example, the list of LCM components for the membership record illustrated in table 1, may be as follows.

TABLE 2

An example of a list of LCM components

| LCM component | Tag |
|---|---|
| $2^{nd}$ LCM component | R: D and E |
| $3^{rd}$ LCM component | R: D and E |
| $4^{th}$ LCM component | dR: C, D and E |
| $8^{th}$ LCM component | R: C, D |

The first service provider cannot route traffic between the domain comprising the end points A, B and C and the end points D and/or E. Therefore each of the LCM components listed in table 2 is capable of performing at least part of the portion of the first service that the first service provider is unable to provide.

As illustrated, in some examples the list of LCM components comprises more than one LCM component capable of providing the same service. In the above example, the $2^{nd}$ LCM component the $3^{rd}$ LCM component are both capable of routing traffic between points D and E.

The membership peer module may then transmit the list of LCM components to the Blockchain application module in step 809. The Blockchain application module may then forward the list of LCM components to the first LCM agent in step 810.

In step 811 the first LCM agent selects one or more LCM components from the list to provide the first service. In the example illustrated in Table 2, there are a number of candidate LCM components that the first LCM agent may use. For example, the first LCM agent may select only the $4^{th}$ LCM component, as this is capable of providing the portion of the first service on its own. However, in some examples, the tags in the membership record may comprise further information, such as a list of LCM components that the associated LCM component is willing to collaborate with, or information associated with a price to the requesting LCM component for providing the requested service.

The first LCM agent may therefore analyse all of the information contained in the associated tags and may select, based on this information, which LCM components from the list to use.

By way of example, suppose the first LCM agent selects the $2^{nd}$ LCM component and $8^{th}$ LCM component to provide the portion of the first service collaboratively. These selected LCM components may be referred to as contractor LCM components.

The first LCM agent 303 may then transmit a contract request to the Blockchain application module 511 comprising one or more of the business model, policies, LCM inputs, and conditions that the $2^{nd}$ LCM component and $8^{th}$ LCM component provide the portion of the first service collaboratively on request.

The smart contract may then be processed by the Blockchain application module 511 and endorsed by the contractor peers in the membership record.

The smart contract establishment process may therefore be summarised as illustrated in FIG. 9.

In step 901 the first LCM component receives the first service request. In step 902 the first LCM component obtains an indication of at least one local service that the first service provider is capable of providing. In step 903 the first LCM component compares the at least one local service to the first service.

In step 904 the LCM component generates a first tag representing a portion of the first service that the first service provider cannot implement and transmits a discovery request to the trusted LCM component comprising the first tag.

In step 905 the trusted LCM component processes the discovery request and generates a list of LCM components each capable of implementing a part of the portion of the first service. In step 906 the trusted LCM component transmits the list to the first LCM component.

In step 907 the first LCM component selects one or more LCM components from the list to provide the portion of the first service and transmits a request to establish a transaction protocol, e,g, a smart contract, with the one or more LCM components to the trusted LCM component. The request to establish the transaction protocol may comprise contract policies. Contract policies may for instance indicate how the smart contract should be managed and which resources can be shared, what capabilities can be exchanged, potential requirements from the related business model, artifacts to be shared, pricing models and many other aspects related to the life-cycle management routines. Contract policies may be negotiated with the involved contractor LCM components during the smart contract establishment but also after the smart contract is granted in additional granting loops.

In step 908 the transaction protocol is processed by the decentralised trust system and endorsed by contractors.

After the transaction protocol is endorsed by the involved contractors, the Blockchain application module may transmit the transaction protocol to the ordering service which creates a Blockchain channel using the transaction protocol policies. Once a Blockchain channel is established, channel data may be distributed by the Blockchain application module to all contractor LCM components. Contractor LCM components may store the received information and create an own representation of the Blockchain. At this stage, the Blockchain channel may be enabled for further business LCM transactions as will be described in more detail below. In other words, the established Blockchain channel may be used for private trusted communication in a trustless environment. This way cross service provider LCM engagements can be established directly between grouped lifecycle management nodes using the common channel.

Detailed LCM Transactions

Figure 10:
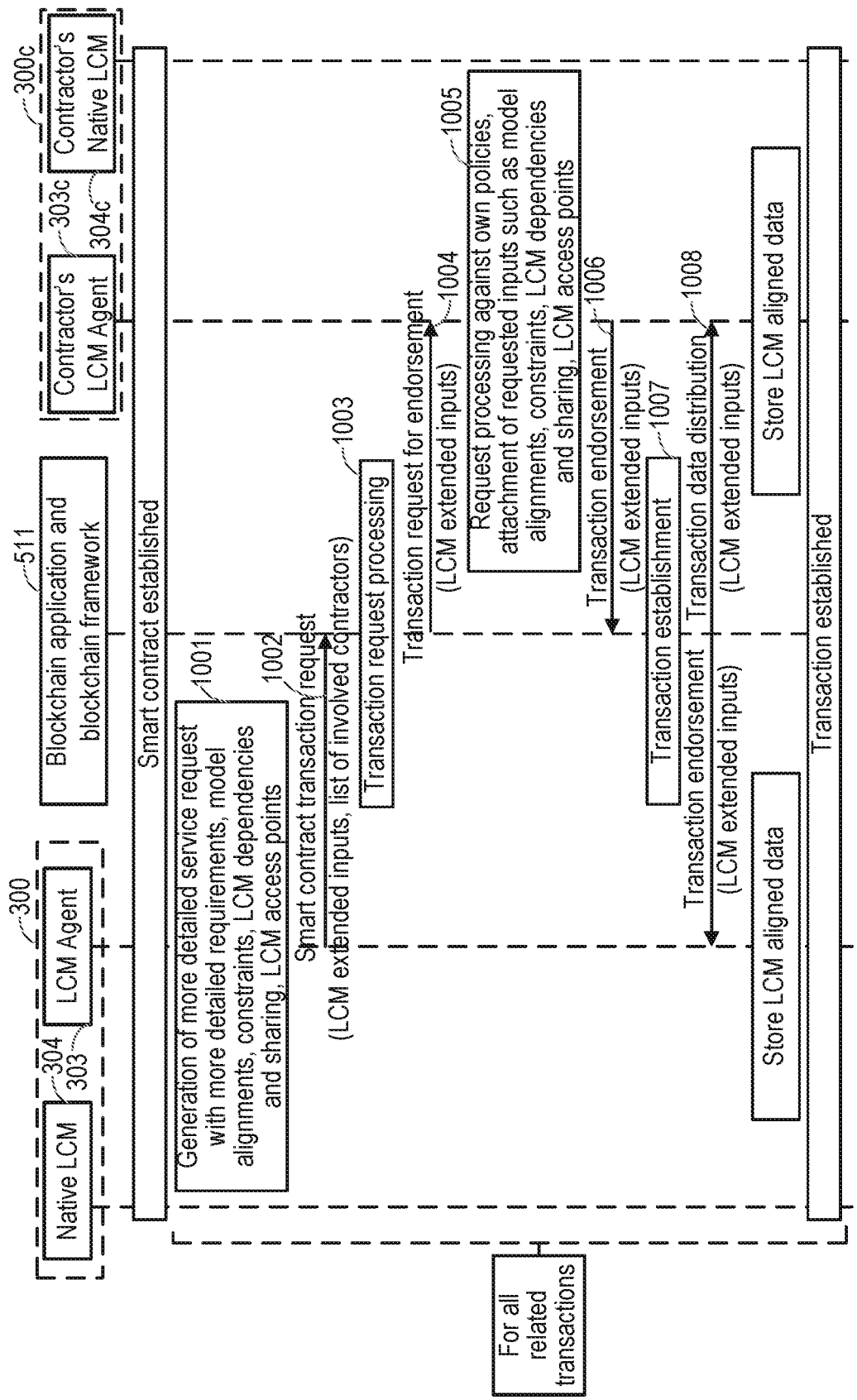
FIG. 10 illustrates detailed LCM transactions according to some embodiments.
Figure 11:
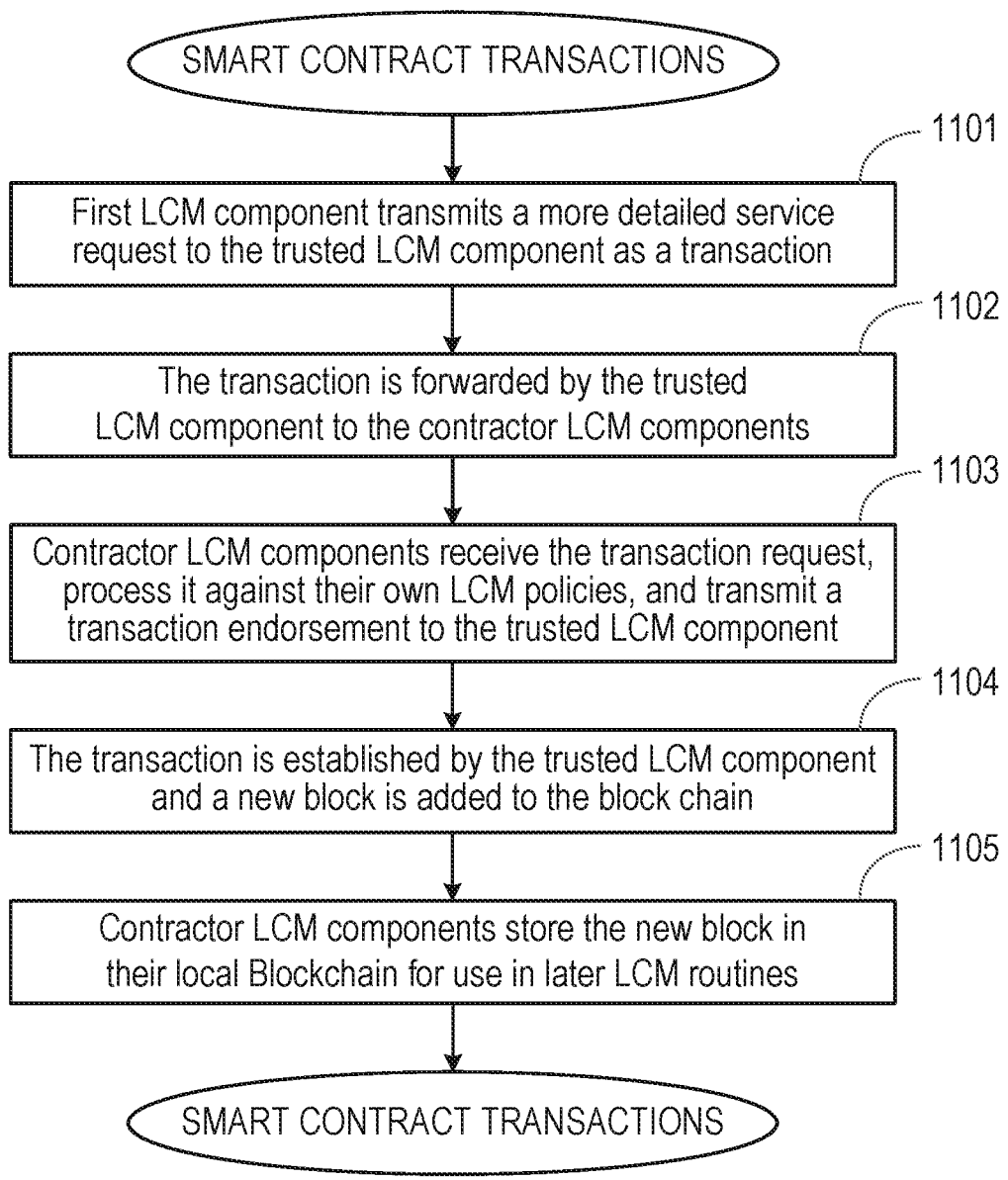
FIG. 11 illustrates detailed LCM transactions according to some embodiments.

FIGS. 10 and 11 illustrate detailed LCM transactions in an example embodiment.

In step 1001 the first LCM agent generates a more detailed service request for the first service. For example, the more detailed service request may comprise more detail of the service requirements, model alignments, constraints (for example a constraint on the bandwidth or performance) LCM dependencies and sharing, and/or details regarding LCM access points. An LCM access point is a point where LCM component can be contacted. An access point may be tenant based or even single service based and may only be disclosed in the detailed service request.

Models may comprise for example orchestration models used for LCM routines. The detailed service request may therefore comprise principles of an orchestration model. Model alignments may also comprise business model details on sharing/usage of the resources/services.

The detailed transaction request may then be transmitted to the Blockchain application module 511 in step 1002 which may process the transaction request in step 1003. For example, the Blockchain application module 511 may process the transaction request and send the transaction request to a selected endorsing peer, i.e. one of the contractor LCM components $300_c$, for validation in step 1004.

The contractor LCM components 300c may be structured similarly to the first LCM component 300. For example, the contractor LCM component 300c may comprise a contractor LCM agent 303c and a contractor native LCM module 304c.

In step 1005 the contractor LCM agent 303c processes the request against the LCM policies, and determines whether or not to endorse the transaction request. If the transaction is endorsed, the contractor LCM agent 303c transmits a transaction endorsement to the Blockchain application module 511 in step 1006. The Blockchain application module 511 then transmits the endorsed transaction request to the rest of the contractor LCM components for validation. The rest of the contractor LCM components validate the transaction request against their own LCM agent policies, add requested LCM inputs, and validate the transaction request.

Once the Blockchain application module receives endorsements from all contractor LCM components, the transaction is established in step 1007 by the ordering peer module and a new block is generated in the smart contract channel. In other words, the ordering peer module takes care of transaction's relationships in the smart contract. In some embodiments, the ordering peer module doesn't have access to the sensitive parts of transaction when creating a new block but rather only subset of publicly available data. The ordering peer module organizes transaction blocks into the ledger and communicates that with committer peer and endorsing peer nodes. In other words, the block data may then be transmitted to all contractor LCM components in the smart contract, in step 1008. After that the contractor LCM components validate the transaction block received from the ordering service and update their ledger and worldstate. In other words, the contractor LCM components 300c store a local copy of the received block data and add it to the locally stored Blockchain.

In some examples a contractor LCM component 300c may suggest some modification to the transaction. Such an update may be generated by the contractor LCM agent 303c and forwarded to all the other contractors in an additional endorsing loop. The Blockchain application module 511 may then wait to receive endorsements from all of the contractor LCM components 300c. It will be appreciated that many iterations of this may occur as different contractor LCM components may suggest different alterations to the transaction.

The process for establishing detailed transactions using the established smart contract can therefore be summarized as illustrated in FIG. 11.

In step 1101 the first LCM component 300 transmits a more detailed service request for the first service to the trusted LCM component as a transaction.

In step 1102 the transaction is forwarded by the trusted LCM component 510 to the contractor LCM components 300c.

In step 1103, the contractor LCM components 300c receive the transaction request, process it against their own LCM policies, and transmit a transaction endorsement to the trusted LCM component 510.

In step 1104, the transaction is established by the trusted LCM component 510 and a new block is added to the block chain. The new block data is distributed to the contractor LCM components 300c.

In step 1105 the contractor LCM components 300c store the new block in their local Blockchain for use in later LCM routines.

In the example illustrated in FIG. 1, mashup service provider A may require external LCM resources that provides database functionality provided by the VNFaaS provider-E in order to provide a mashup service. The service provider A can commit transaction(s) related to that business aspect over the smart contract. Both the service providers use infrastructure resources provided by the IaaS service provider B so they can commit transactions related to that business aspect involving service provider B in the smart contract. Service provider A can also use security service provided by the SaaS service provider D and can commit transactions related to that business aspect over the smart contract.

In this example therefore the smart contract comprises 4 contractor LCM components, the LCM of service provider A, the LCM component of service provider B, the LCM component of service provider E and the LCM component of service provider D.

By initiating the smart contract presented in this example all of the involved contractor LCM components may use resources from the NFVIaaS service provider C, which in this example also provides Blockchain network service in addition to NFVI services. The relationships established in the smart contract may be agreed in a single transaction or set of individual transactions. For instance, providers A, C, D and E can agree individually with infrastructure provider B on resource allocation using individual transactions, or together in the same transaction.

All used resources in the mashup service example and dependent LCM interactions may be negotiated via the smart contract and related detailed transactions. After the detailed transactions have been established, the service provider A, for instance, will know exactly how to use resources and trigger dependent LCM routines in the VNFaaS provider E in order to get dependent database functions aggregated into the service that has been requested at service provider A. In the same way service provider A can enable the security service provided by the SaaS provider D. The Blockchain can also be updated later on after the real LCM routines has been started. For instance, in the case of some provisioning lack of resources trigger, more resources can be reserved for the targeted service via additional business transaction in the Blockchain.

Direct LCM Orchestration and Mashup Service Fulfilment

Once the transaction protocol, or smart contract, has been established and providers has agreed via related set of detailed transactions, on how resources may be shared and how orchestration dependencies may be realized, the real LCM routines can start accordingly.

At this point, contractor LCM components 300c can interact directly utilizing corresponding LCM agents, or interact directly with domain native LCM components via interfaces negotiated in the previous stages. Any contracted service provider may benefit from the established smart contract in the defined business model borders and under defined orchestration policies.

Contracted service providers may for example share LCM provisioning data, or they may trigger dependent LCM routines using exposed LCM access points. An LCM access point is a point where LCM component can be contacted by an authorized entity, for example another LCM component. An access point may be tenant based or even single service based and may only be disclosed in the private channel. The level of sharing, including data and LCM interactions, may be predefined by the smart contract and may be controlled by the contracted LCM agents. Any additional openness in that field can create additional values to the rest of contractors. For instance the sharing of provisioning data directly used in the mashup service optimization may bring more business opportunities to the contractor service providers. The established Blockchain, or other decentralized trust system, channels provides direct LCM interaction without having to establish trust by using interactions via multiple orchestration levels, for example using an OSS/BSS bridge, with very limited interaction opportunities and very slow procedures.

In example illustrated in FIG. 1, provider A utilizes database access points and capabilities from the provider E. Provider E can in addition provide an interface to trigger scaling workflow routines of the database resources as well as some subset of provisioning data via established trusted channels. Provider A may then combine these functionalities with knowledge of a number of client application users and its own set of provisioning data in order to optimize the targeted mashup service.

A smart contract may have a negotiated life time which may be business specific. In this way the contractor LCM components may utilize the smart contract as long as the relevant business interest exists. In some examples specific transactions may be initialized by a contractor in order to terminate a smart contract. In the termination of the contract the involved contractor LCM components may exchange assets and generate a resulting balance sheet of the related business at any point of time.

Service providers involved in such a mart contract may be a subset of eco-system providers within a common business interest following a common business model. The same contractor LCM components may be involved in many smart contracts and business models at a same time. Thus, a service provider can offer, at a same time, LCM services to other services providers with different business models.

Figure 12:
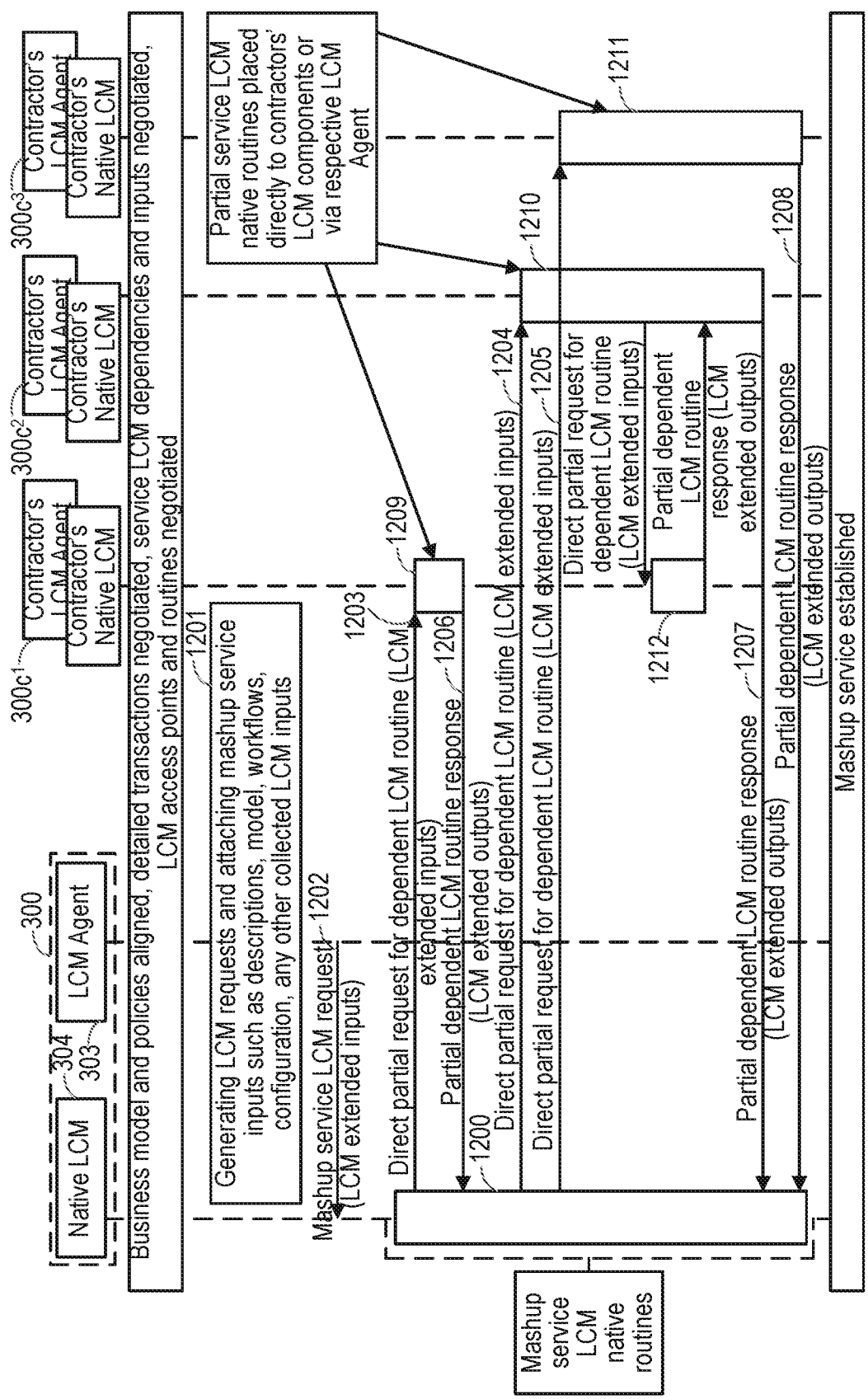
FIG. 12 illustrates an example of direct LCM orchestration.
Figure 13:
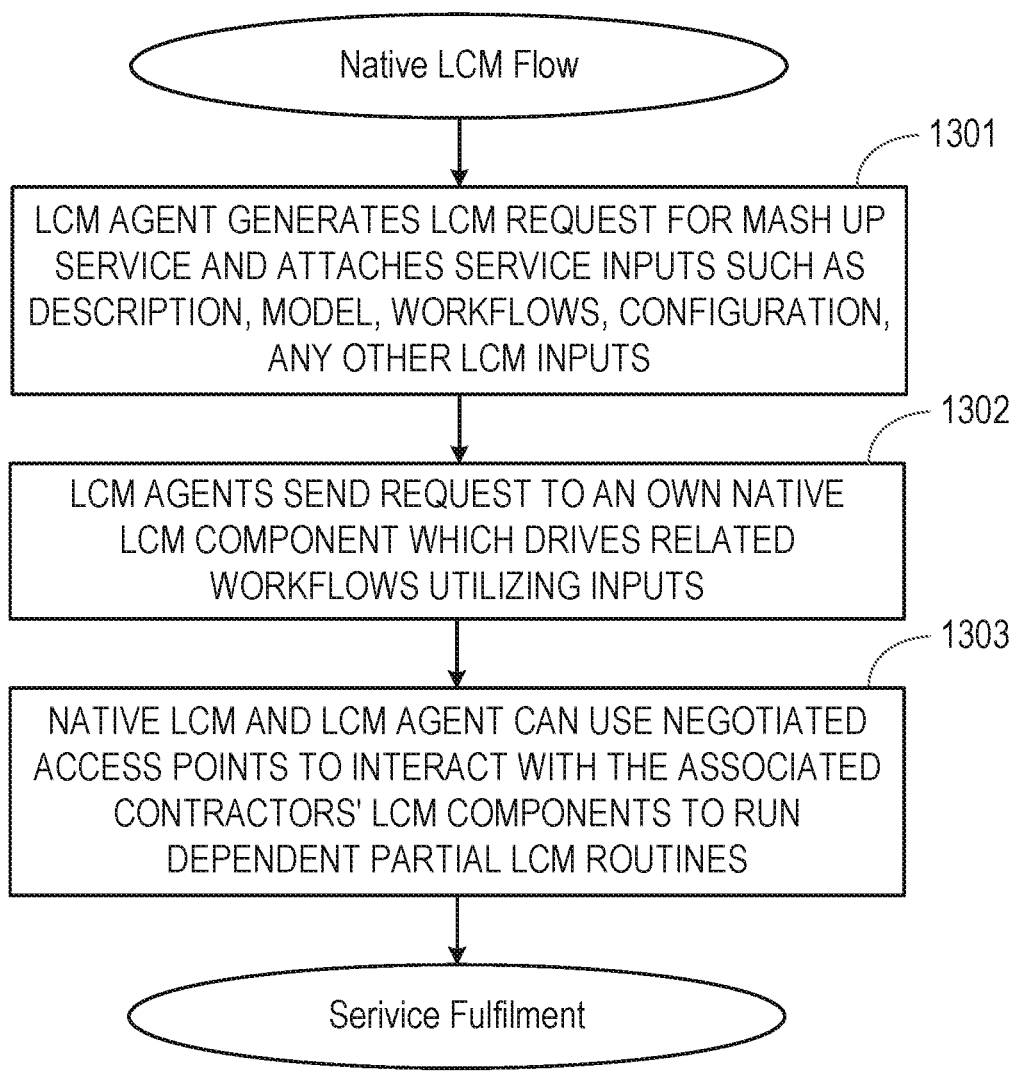
FIG. 13 illustrates an example of direct LCM orchestration.

FIGS. 12 and 13 illustrate an example of direct LCM orchestration in order to provide the first service 1200 according to some embodiments.

In step 1201 the first LCM agent 303 generated the first service request as a mashup service request based on the detailed transactions negotiated with the contractor LCM components. The mashup service request is then transmitted to the first native LCM module 304 in step 1202.

In step 1204 the first native LCM module 304 may then transmit a provision request to a first contractor LCM component $300c^1$ to request that the first contractor LCM component $300c^1$ provide the part of the portion of the first service that was agreed upon during the smart contract negotiations.

Equivalent provision requests may be transmitted to any other contractor LCM components required to fulfill the first service, for example in steps 1204 and 1205.

The contractor LCM components may respond to the provision request in steps 1206, 1207 and 1208 and may provide the respective services, 1209, 1210 and 1211 as requested.

In some examples, the contractor LCM components may rely on smart sub-contracts with sub-contractor LCM components to provide the part of the portion of the first service which they offered to the first LCM component. For example, in FIG. 12, the contractor LCM component $300c^2$ has sub-contracted contractor LCM component $300c^1$ to provide a part 1212 of the service 1210.

Returning to the example of the distributed router. For the sake of example suppose the $2^{nd}$ LCM component and $8^{th}$ LCM component are selected from the list of LCM components and a valid contract is negotiated. To provide the first service of the distributed router between the five end points A, B, C, D and E the first LCM component may transmit a provisioning request to the $2^{nd}$ LCM component to provide the service of routing traffic between the end points D and E. Equivalently the first LCM component may transmit a provisioning request to the $8^{th}$ LCM component to provide the service of routing traffic between the end points C and D.

Due to the previously negotiated smart contract, the $2^{nd}$ LCM component and $8^{th}$ LCM component may therefore provide the respective parts of the portion of the first service that the first service provide was unable to provide. The provision of these services may be compensated in some way by protocols negotiated in the smart contract. For example, the first service provider may pay in some way, for example with other services or with monetary compensation, for the $2^{nd}$ LCM component and the $8^{th}$ LCM component to provide the relevant services.

The first service provider may provide the service of routing traffic between the end points A, B and C. Therefore together, the first LCM component, $2^{nd}$ LCM component and $8^{th}$ LCM component can provide the full first service as requested.

The process of direct LCM orchestration may therefore be summarized as illustrated in FIG. 13.

In step 1301 the first LCM agent generates a provision request. The provision request may comprise tags describing the service description, model, workflows, configuration and/or another other LCM inputs.

The LCM agent may send the provision request to the first native LCM module which may drive the related workflows in step 1302.

In step 1303, the first native LCM module and the first LCM agent may then use access points negotiated in the smart contract to interact with the contractor LCM components to run the dependent partial LCM routines. The requested service thereby being fulfilled.

Figure 14:
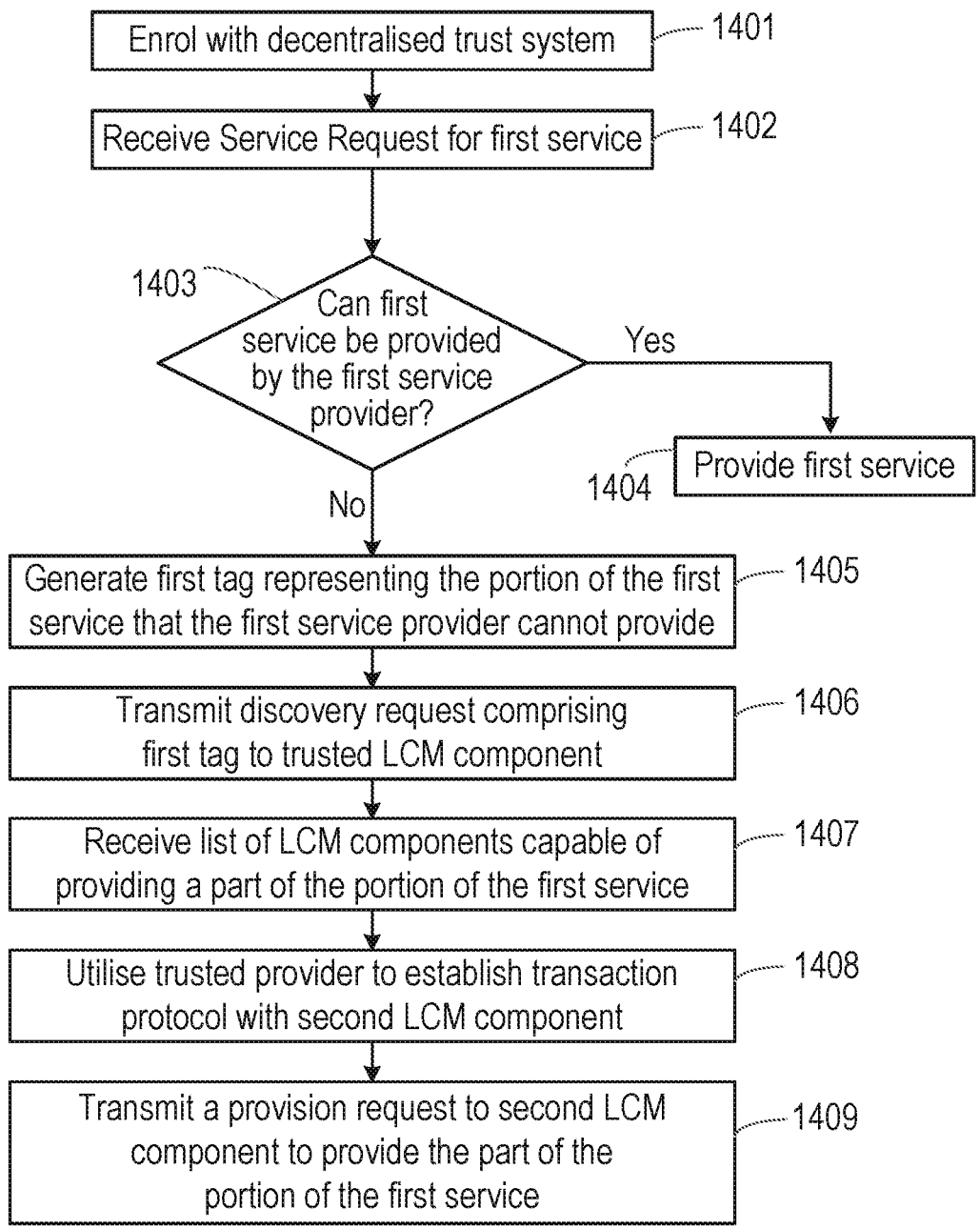
FIG. 14 illustrates a method performed by a first LCM component according to some embodiments.

FIG. 14 illustrates a method performed by the first LCM component according to some embodiments.

In some examples, the first LCM component enrolls with a decentralized trust system, for example a Blockchain trust system, in step 1401.

In step 1402, the first LCM component receives a request for a first service from the first service provider.

In step 1403 the first LCM component determines whether the first service can be fully provided by the first service provider. If the first LCM component determines that the first service can be fully provided by the first service provider, the first service provider provides the service in step 1404.

If in step 1403 the first LCM component determines that the first service cannot be fully provided by the first service provider, the method passes to step 1405

In step 1405 the first LCM component may generate a first tag representing a portion of the first service that the first LCM component cannot provide.

In step 1406 the first LCM component may transmit a discovery request to the trusted LCM component comprising the first tag. The discovery request may therefore indicate to the trusted LCM component which portions of the first service need to be provided by one of the plurality of service providers enrolled with the decentralized trust system. The first tag may comprise information relating to the reputation of the first service provider; a type of the first service; and/or a price associated with the first service.

In step 1407 the first LCM component may then receive, from the trusted LCM component, based on the first tag, a list of LCM components comprising a second LCM component controlled by a second service provider, wherein the second service provider is capable of providing a part of the portion of the first service. In some embodiments, the list may comprise only the second LCM component.

The first LCM component may then select LCM components from the list to provide the first service.

The first LCM component may then in step 1408 utilise the trusted LCM component to establish a transaction protocol, or smart contract, with second LCM component, and with any other LCM components selected from the list. The transaction protocol may comprise a condition that the second LCM component provide the part of the first service on request from the first service provider.

In step 1409 the first LCM component may transmit a provision request to the second LCM component to request that the second LCM component provide the part of the portion of the first service. In examples, where a plurality of LCM components are selected such that the plurality of LCM components are collectively capable of providing the portion of the first service, the first LCM component may transmit provision requests to each of the plurality of LCM components to collectively perform the portion of the first service.

Figure 15:
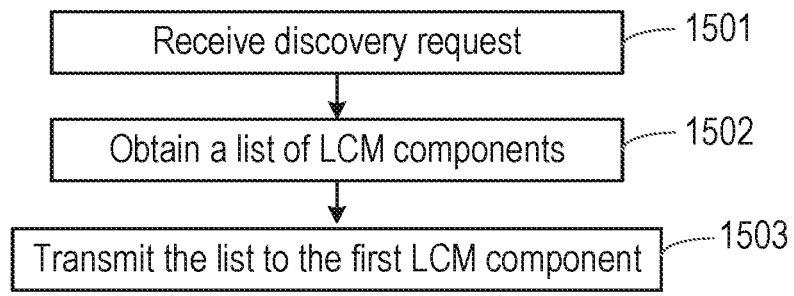
FIG. 15 illustrates a method performed by a trusted LCM component according to some embodiments.

FIG. 15 illustrates a method performed by the trusted LCM component, controlled by a trusted service provider, according to some embodiments.

The trusted LCM component is configured to provide a decentralised trust system between a plurality of lifecycle management, LCM, components controlled by different service providers in the virtual network.

In step 1501, the trusted LCM component receives a discovery request from a first LCM component controlled by a first service provider, wherein the discovery request comprises a first tag associated with a portion of a first service that the first service provider cannot provide.

In step 1502, the trusted LCM component obtains, based on the first tag and a membership record comprising entries for each of the plurality of LCM components enrolled on the decentralised trust system, a list of LCM components comprising a second LCM component controlled by a second service provider, wherein the second service provider is capable of providing a part of the portion of the first service.

In some embodiments, the trusted LCM component may locate at least one entry in the membership record comprising at least one tag which indicates that the associated LCM component is capable of providing at least a part of the service represented by the first tag; and add the at least one entry to the list of LCM components.

In step 1503 the trusted LCM component transmits the list to the first LCM component.

In some embodiments the trusted LCM component establishes a transaction protocol between the first LCM component and the second LCM component wherein the transaction protocol comprises a condition that the second LCM component will provide the part of the portion of the first service upon receiving an provision request from the first LCM component.

In some embodiments the trusted LCM component first enrolls the first LCM component on the decentralised trust system. The enrolling may comprise receiving an enrolment request comprising at least one local tag associated with at least one local service that the first service provider is capable of providing; and recording the at least one local tag alongside the first LCM component in the membership record.

Each entry of the membership record may comprise an LCM component associated with at least one tag, wherein the at least one tag represents at least one service that the associated LCM component is capable of providing.

Figure 16:
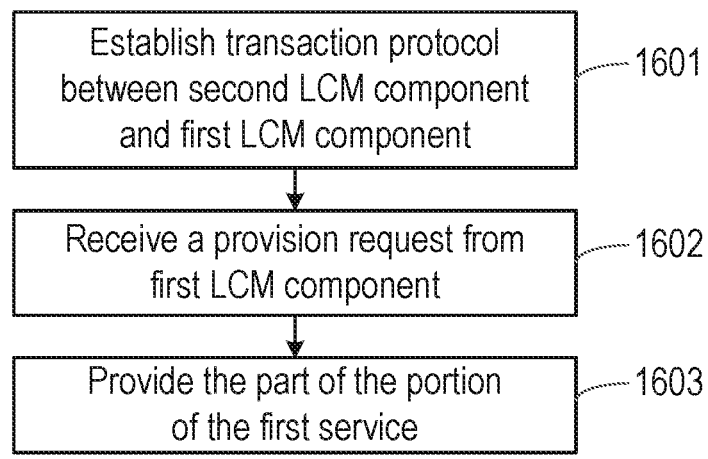
FIG. 16 illustrates a method performed by a second LCM component according to some embodiments.

FIG. 16 illustrates a method performed by a second LCM component, or a contractor LCM component.

In step 1601 the second LCM component establishes a transaction protocol between the second LCM component and a first LCM component, wherein the first LCM component is enrolled with the decentralised trust system. For example, the second LCM component may negotiate detailed LCM transactions with the first LCM component. It will be appreciated that the transaction protocol may be between a plurality of LCM components, all contributing to provide the full first service.

In step 1602, the second LCM component receives a provision request from the first LCM component to provide a part of a portion of a first service.

In step 1603 the second LCM component provides the part of the portion of the first service.

In some embodiments the second LCM component first enrolls with the decentralised trust system. For example, the second LCM component may transmit, to the trusted LCM component, an enrolment request comprising a local tag representing at least one local service that the second service provider is capable of providing.

Figure 17:
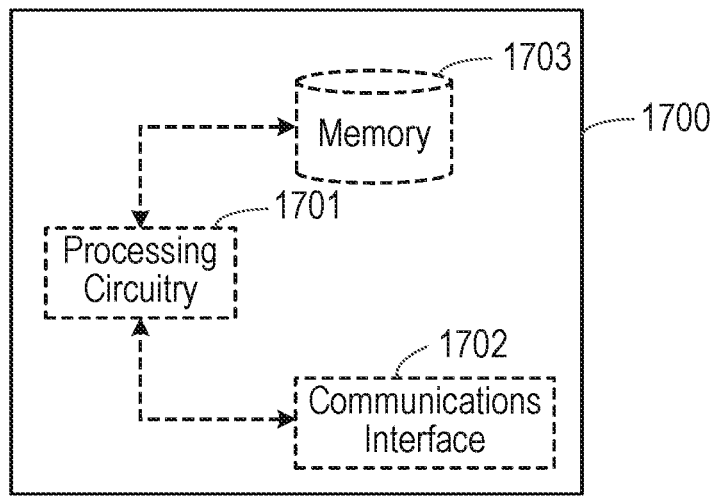
FIG. 17 illustrates a first LCM component according to some embodiments.

FIG. 17 illustrates a first LCM component 1700 according to some embodiments comprising processing circuitry (or logic) 1701. The processing circuitry 1701 controls the operation of the first LCM component 1700 and can implement the method described herein in relation to a first LCM component 1700. The processing circuitry 1701 can comprise one or more processors, processing units, multi-core processors or modules that are configured or programmed to control the first LCM component 1700 in the manner described herein. In particular implementations, the processing circuitry 1701 can comprise a plurality of software and/or hardware modules that are each configured to perform, or are for performing, individual or multiple steps of the method described herein in relation to the first LCM component 1700.

Briefly, the processing circuitry 1701 of the first LCM component 1700 is configured to: receive a service request to provide a first service; responsive to a determination that the first service cannot be fully provided by the first service provider, generate a first tag representing a portion of the first service that the first service provider cannot provide; transmit a discovery request to the trusted LCM component, wherein the discovery request comprises the first tag; receive, from the trusted LCM component based on the first tag, a list of LCM components comprising a second LCM component controlled by a second service provider, wherein the second service provider is capable of providing a part of the portion of the first service; and transmit a provision request to the second LCM component to provide the part of the portion of the first service.

In some embodiments, the first LCM component 1700 may optionally comprise a communications interface 1702. The communications interface 1702 of the first LCM component 1700 can be for use in communicating with other nodes, such as other virtual nodes. For example, the communications interface 1702 of the first LCM component 1700 can be configured to transmit to and/or receive from other nodes requests, resources, information, data, signals, or similar. The processing circuitry 1701 of the first LCM component 1700 may be configured to control the communications interface 1702 of the first LCM component 1700 to transmit to and/or receive from other nodes requests, resources, information, data, signals, or similar.

Optionally, the first LCM component 1700 may comprise a memory 1703. In some embodiments, the memory 1703 of the first LCM component 1700 can be configured to store program code that can be executed by the processing circuitry 1701 of the first LCM component 1700 to perform the method described herein in relation to the first LCM component 1700. Alternatively or in addition, the memory 1703 of the first LCM component 1700, can be configured to store any requests, resources, information, data, signals, or similar that are described herein. The processing circuitry 1701 of the first LCM component 1700 may be configured to control the memory 1703 of the first LCM component 1700 to store any requests, resources, information, data, signals, or similar that are described herein.

Figure 18:
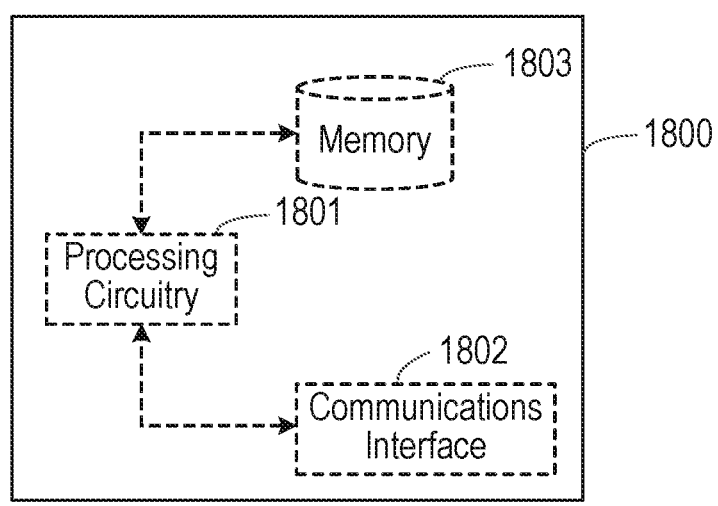
FIG. 18 illustrates a trusted LCM component according to some embodiments.

FIG. 18 illustrates a trusted LCM component 1800 according to some embodiments comprising processing circuitry (or logic) 1801. The processing circuitry 1801 controls the operation of the trusted LCM component 1800 and can implement the method described herein in relation to a trusted LCM component 1800. The processing circuitry 1801 can comprise one or more processors, processing units, multi-core processors or modules that are configured or programmed to control the trusted LCM component 1800 in the manner described herein. In particular implementations, the processing circuitry 1801 can comprise a plurality of software and/or hardware modules that are each configured to perform, or are for performing, individual or multiple steps of the method described herein in relation to the trusted LCM component 1800.

Briefly, the processing circuitry 1801 of the trusted LCM component 1800 is configured to: receive a discovery request from a first LCM component controlled by a first service provider, wherein the discovery request comprises a first tag associated with a portion of a first service that the first service provider cannot provide; obtain, based on the first tag and a membership record comprising entries for each of the plurality of LCM components enrolled on the decentralised trust system, a list of LCM components comprising a second LCM component controlled by a second service provider, wherein the second service provider is capable of providing a part of the portion of the first service; and transmit the list to the first LCM component.

In some embodiments, the trusted LCM component 1800 may optionally comprise a communications interface 1802. The communications interface 1802 of the trusted LCM component 1800 can be for use in communicating with other nodes, such as other virtual nodes. For example, the communications interface 1802 of the trusted LCM component 1800 can be configured to transmit to and/or receive from other nodes requests, resources, information, data, signals, or similar. The processing circuitry 1801 of the trusted LCM component 1800 may be configured to control the communications interface 1802 of the trusted LCM component 1800 to transmit to and/or receive from other nodes requests, resources, information, data, signals, or similar.

Optionally, the trusted LCM component 1800 may comprise a memory 1803. In some embodiments, the memory 1803 of the trusted LCM component 1800 can be configured to store program code that can be executed by the processing circuitry 1801 of the trusted LCM component 1800 to perform the method described herein in relation to the trusted LCM component 1800. Alternatively or in addition, the memory 1803 of the trusted LCM component 1800, can be configured to store any requests, resources, information, data, signals, or similar that are described herein. The processing circuitry 1801 of the trusted LCM component 1800 may be configured to control the memory 1803 of the trusted LCM component 1800 to store any requests, resources, information, data, signals, or similar that are described herein.

Figure 19:
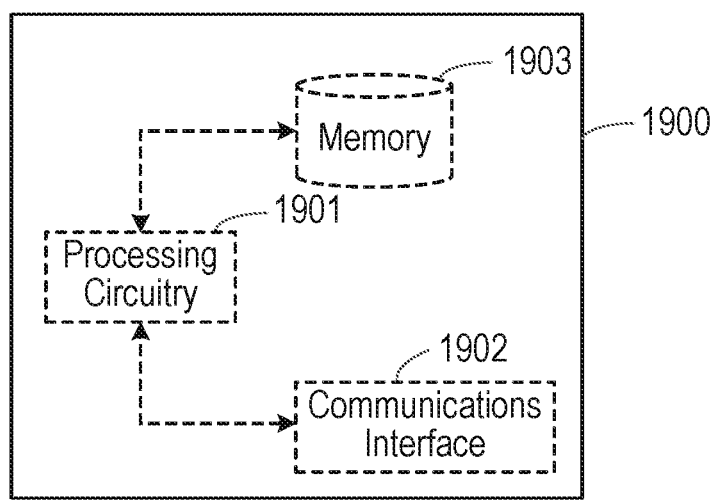
FIG. 19 illustrates a second LCM component according to some embodiments.

FIG. 19 illustrates a second LCM component 1900, or contractor LCM component, according to some embodiments comprising processing circuitry (or logic) 1901. The processing circuitry 1901 controls the operation of the second LCM component 1900 and can implement the method described herein in relation to a second LCM component 1900 or contractor LCM component. The processing circuitry 1901 can comprise one or more processors, processing units, multi-core processors or modules that are configured or programmed to control the second LCM component 1900 in the manner described herein. In particular implementations, the processing circuitry 1901 can comprise a plurality of software and/or hardware modules that are each configured to perform, or are for performing, individual or multiple steps of the method described herein in relation to the second LCM component 1900.

Briefly, the processing circuitry 1901 of the second LCM component 1900 is configured to: establish a transaction protocol between the second LCM component and a first LCM component, wherein the first LCM component is enrolled with the decentralised trust system; receive a provision request from the first LCM component to provide a part of a portion of a first service; and provide the part of the portion of the first service.

In some embodiments, the second LCM component 1900 may optionally comprise a communications interface 1902. The communications interface 1902 of the second LCM component 1900 can be for use in communicating with other nodes, such as other virtual nodes. For example, the communications interface 1902 of the second LCM component 1900 can be configured to transmit to and/or receive from other nodes requests, resources, information, data, signals, or similar. The processing circuitry 1901 of the second LCM component 1900 may be configured to control the communications interface 1902 of the second LCM component 1900 to transmit to and/or receive from other nodes requests, resources, information, data, signals, or similar.

Optionally, the second LCM component 1900 may comprise a memory 1903. In some embodiments, the memory 1903 of the second LCM component 1900 can be configured to store program code that can be executed by the processing circuitry 1901 of the second LCM component 1900 to perform the method described herein in relation to the second LCM component 1900. Alternatively or in addition, the memory 1903 of the second LCM component 1900, can be configured to store any requests, resources, information, data, signals, or similar that are described herein. The processing circuitry 1901 of the second LCM component 1900 may be configured to control the memory 1903 of the second LCM component 1900 to store any requests, resources, information, data, signals, or similar that are described herein.

There is therefore provided methods and apparatus for providing multi-provider services using direct interaction between LCM components. This enables a direct LCM orchestration establishment between function/service providers on the single orchestration level, which avoids complex loops crossing multiple orchestration levels. The embodiments described herein also provide an open solution for negotiation of trustiness in multi-provider LCM environments using compact LCM agent component and utilizing consensus based Blockchain technology.

By using the shortest direct negotiation path via LCM agents, embodiments described herein increase flexibility, simplicity and agility of LCM routines across dependent multi-provider domains. Orchestration takes a few seconds rather than months.

Embodiments disclosed herein use LCM discovery tags for discovery mechanisms, tags such as prioritization tags based on provider's reputation, service offerings, service price, modeling, relationship and many other LCM aspects.

Embodiments disclosed herein therefore provide a simplified solution of direct orchestration model alignments in runtime.

It should be noted that the above-mentioned embodiments illustrate rather than limit the invention, and that those skilled in the art will be able to design many alternative embodiments without departing from the scope of the appended claims. The word "comprising" does not exclude the presence of elements or steps other than those listed in a claim, "a" or "an" does not exclude a plurality, and a single processor or other unit may fulfil the functions of several units recited in the claims. Any reference signs in the claims shall not be construed so as to limit their scope.

| Abbreviation | Explanation |
| --- | --- |
| AaaS | Application as a Service |
| BSS | Business support system |
| CDM | Cloud Deployment Model |
| ETSI | European Telecommunications Standards Institute |
| IaaS | Infrastructure as a Service |
| LCM | Life-cycle management |
| MEF | Metro Ethernet Forum |
| NFV | Network Function Virtualization |
| NFVIaaS | NFV Infrastructure as a Service |
| NGMN | Next Generation Mobile Networks |
| ONAP | Open Network Automation Platform |
| OSS | Operations Support Systems |
| SCBaaS | Smart Contract Blockchain as a Service |
| SDN | Software-Defined Networking |
| VNF | Virtualized Network Function |
| VNFaaS | VNF as a Service |
| XaaS | 'X' as a Service |

The invention claimed is:

1. A method, in a first lifecycle management, LCM, component controlled by a first service provider in a virtual network, wherein the virtual network comprises a trusted LCM component controlled by a trusted provider configured to provide a decentralised trust system between a plurality of LCM components controlled by different service providers in the virtual network, the method comprising:
receiving a service request to provide a first service;
responsive to a determination that the first service cannot be fully provided by the first service provider, generating a first tag representing a portion of the first service that the first service provider cannot provide;
transmitting a discovery request to the trusted LCM component, wherein the discovery request comprises the first tag;
receiving, from the trusted LCM component based on the first tag and a membership record comprising entries for each of the plurality of LCM components enrolled on the decentralised trust system, a list of LCM components comprising a second LCM component controlled by a second service provider, wherein the second service provider is capable of providing a part of the portion of the first service;
utilising the trusted LCM component to establish a transaction protocol with the second LCM component, wherein the transaction protocol comprises a contract with contract policies which has a negotiated life time during the establishment of the contract and after the contract is granted; and
transmitting a provision request to the second LCM component to provide the part of the portion of the first service.

2. The method as claimed in claim 1 further comprising, before transmitting the provision request, wherein the transaction protocol comprises a condition that the second LCM component will provide the part of the portion of the first service upon receiving the provision request.

3. The method as claimed in claim 2 wherein the transaction protocol is established with the second LCM component and a third LCM component, and wherein each transaction is validated by both the second LCM component and the third LCM component.

4. The method as claimed in claim 1 further comprising first enrolling with the decentralised trust system.

5. The method as claimed in claim 4 wherein the step of enrolling comprises transmitting, to the trusted LCM component, an enrolment request comprising a local tag representing at least one local service that the first service provider is capable of providing.

6. The method as claimed in claim 1 further comprising:
determining that portion of the first service cannot be provided by the first service provider by determining at least one local service that the first service provider is capable of providing;
comparing the at least one local service to the first service;
determining, based on the comparison, the portion of the first service which cannot be provided by the first service provider.

7. The method as claimed in claim 6 wherein the step of determining that the portion of the first service cannot be provided by the first service provider further comprises comparing the first service to a first set of policies associated with the first LCM component.

8. The method as claimed in claim 1 wherein the list comprises a plurality of candidate LCM components capable of providing the part of the portion of the first service; and wherein the method further comprises:
selecting the second LCM component from the plurality of candidate LCM components.

9. The method as claimed in claim 1 wherein the list comprises a plurality of candidate LCM components, wherein the plurality of candidate LCM components are each capable of providing a part of the portion of the first service.

10. The method as claimed in claim 9 wherein the method further comprises:
selecting, from the plurality of LCM components, one or more LCM components such that the one or more LCM components are collectively capable of providing the portion of the first service; and transmitting provision requests to each of the selected LCM components to collectively perform the portion of the first service.

11. The method as claimed in claim 1 wherein the decentralised trust system comprises a block chain trust system.

12. The method as claimed in claim 1 wherein the first tag comprises information relating to the reputation of the first service provider; a type of the first service; and/or a price associated with the first service.

13. A method, in a trusted Lifecycle Management, LCM, component controlled by a trusted service provider in a virtual network, wherein the trusted LCM component is configured to provide a decentralised trust system between a plurality of lifecycle management, LCM, components controlled by different service providers in the virtual network; the method comprising:
receiving a discovery request from a first LCM component controlled by a first service provider, wherein the discovery request comprises a first tag associated with a portion of a first service that the first service provider cannot provide;
obtaining, based on the first tag and a membership record comprising entries for each of the plurality of LCM components enrolled on the decentralised trust system, a list of LCM components comprising a second LCM component controlled by a second service provider, wherein the second service provider is capable of providing a part of the portion of the first service; and
transmitting the list to the first LCM component; and
establishing a transaction protocol between the first LCM component and the second LCM component, wherein the transaction protocol comprises a contract with contract policies which has a negotiated life time during the establishment of the contract and after the contract is granted, such that a provision request is transmitted from the first LCM component to the second LCM component to provide the part of the portion of the first service.

14. The method as claimed in claim 13 wherein the transaction protocol comprises a condition that the second LCM component will provide the part of the portion of the first service upon receiving a provision request from the first LCM component.

15. The method as claimed in claim 13 further comprising first enrolling the first LCM component the decentralised trust system.

16. The method as claimed in claim 15 wherein the step of enrolling comprises receiving an enrolment request comprising at least one local tag associated with at least one local service that the first service provider is capable of providing; and
recording the at least one local tag alongside the first LCM component in the membership record.

17. The method as claimed in claim 13 wherein each entry of the membership record comprises an LCM component associated with at least one tag, wherein the at least one tag represents at least one service that the associated LCM component is capable of providing.

18. The method as claimed in claim 16 wherein the step of obtaining comprises:
locating at least one entry in the membership record comprising at least one tag which indicates that the associated LCM component is capable of providing at least a part of the service represented by the first tag; and adding the at least one entry to the list of LCM components.

19. The method as claimed in claim 13 wherein the discovery request comprises a plurality of first tags.

20. A method, in a second Lifecycle Management, LCM, component controlled by a second service provider in a virtual network wherein the virtual network comprises a trusted LCM component, controlled by a trusted service provider, configured to provide a decentralised trust system between a plurality of LCM components controlled by different service providers in the virtual network, the method comprising:
responsive to a list of LCM components which is obtained based on a first tag associated with a portion of a first service that a first service provider cannot provide and further based on a membership record comprising entries for each of the plurality of LCM components enrolled on the decentralised trust system and which comprises the second LCM component capable of providing a part of the portion of the first service, establishing a transaction protocol between the second LCM component and a first LCM component controlled by the first service provider via the trusted LCM component, wherein the transaction protocol comprises a contract with contract policies which has a negotiated life time during the establishment of the contract and after the contract is granted;
receiving a provision request from the first LCM component to provide the part of the portion of the first service; and
providing the part of the portion of the first service.

21. The method as claimed in claim 20 further comprising first enrolling with the decentralised trust system.

22. The method as claimed in claim 21 wherein the step of enrolling comprises transmitting, to the trusted LCM component, an enrolment request comprising a local tag representing at least one local service that the second service provider is capable of providing.

23. A first Life Cycle Management, LCM, component controlled by a first service provider in a virtual network, wherein the virtual network comprises a trusted LCM component controlled by a trusted service provider configured to provide a decentralised trust system between a plurality of LCM components controlled by different service providers in the virtual network, the first LCM component comprising processing circuitry configured to:
receive a service request to provide a first service;
responsive to a determination that the first service cannot be fully provided by the first service provider, generate a first tag representing a portion of the first service that the first service provider cannot provide;
transmit a discovery request to the trusted LCM component, wherein the discovery request comprises the first tag;
receive, from the trusted LCM component based on the first tag and a membership record comprising entries for each of the plurality of LCM components enrolled on the decentralised trust system, a list of LCM components comprising a second LCM component controlled by a second service provider, wherein the second service provider is capable of providing a part of the portion of the first service;
utilise the trusted LCM component to establish a transaction protocol with the second LCM component, wherein the transaction protocol comprises a contract with contract policies which has a negotiated life time during the establishment of the contract and after the contract is granted; and transmit a provision request to the second LCM component to provide the part of the portion of the first service.

24. A trusted Lifecycle Management, LCM, component controlled by a trusted service provider in a virtual network, wherein the trusted LCM component is configured to provide a decentralised trust system between a plurality of lifecycle management, LCM, components controlled by different service providers in the virtual network; the trusted LCM component comprising processing circuitry configured to:

receive a discovery request from a first LCM component controlled by a first service provider, wherein the discovery request comprises a first tag associated with a portion of a first service that the first service provider cannot provide;

obtain, based on the first tag and a membership record comprising entries for each of the plurality of LCM components enrolled on the decentralised trust system, a list of LCM components comprising a second LCM component controlled by a second service provider, wherein the second service provider is capable of providing a part of the portion of the first service; and transmit the list to the first LCM component; and establish a transaction protocol between the first LCM component and the second LCM component, wherein the transaction protocol comprises a contract with contract policies which has a negotiated life time during the establishment of the contract and after the contract is granted, such that a provision request is transmitted from the first LCM component to the second LCM component to provide the part of the portion of the first service.

* * * * *